US012480887B1

(12) United States Patent
Marchese et al.

(10) Patent No.: US 12,480,887 B1
(45) Date of Patent: Nov. 25, 2025

(54) MULTI-MODE OBJECT DETECTION

(71) Applicant: RaySecur, Inc., Westwood, MA (US)

(72) Inventors: Linda Marchese, Québec (CA); Marc Terroux, Québec (CA); Alexander Georg Sappok, Newton, MA (US); Charles McAlister Marshall, North Andover, MA (US)

(73) Assignee: RaySecur, Inc., Westwood, MA (US)

( * ) Notice: Subject to any disclaimer, the term of this patent is extended or adjusted under 35 U.S.C. 154(b) by 195 days.

(21) Appl. No.: 18/403,813

(22) Filed: Jan. 4, 2024

Related U.S. Application Data

(60) Provisional application No. 63/437,419, filed on Jan. 6, 2023.

(51) Int. Cl.
*G01N 21/90* (2006.01)
(52) U.S. Cl.
CPC ......... *G01N 21/90* (2013.01); *G01N 2201/10* (2013.01); *G01N 2201/127* (2013.01)
(58) Field of Classification Search
CPC .............. G01N 21/90; G01N 2201/10; G01N 2201/127
See application file for complete search history.

(56) References Cited

U.S. PATENT DOCUMENTS

| | | | |
|---|---|---|---|
| 4,454,605 A | 6/1984 | De Lucia | |
| 6,815,683 B2 | 11/2004 | Federici et al. | |
| 10,247,842 B2 * | 4/2019 | Marchese | ............. H04N 23/80 |
| 11,257,257 B1 * | 2/2022 | Panosian | ................ G06V 10/44 |
| 11,300,699 B2 | 4/2022 | Marchese et al. | |
| 11,852,772 B2 | 12/2023 | Marchese et al. | |
| 2002/0046995 A1 | 4/2002 | Chang et al. | |
| 2004/0000999 A1 | 1/2004 | Turner et al. | |
| 2004/0065831 A1 | 4/2004 | Federici et al. | |
| 2006/0056586 A1 | 3/2006 | Uetake et al. | |
| 2008/0231808 A1 | 9/2008 | Van de Velde | |
| 2013/0170611 A1 | 7/2013 | Beckmann et al. | |
| 2013/0229511 A1 | 9/2013 | Oostendorp et al. | |
| 2014/0125969 A1 | 5/2014 | Jordan | |

(Continued)

OTHER PUBLICATIONS

Notice of Allowance mailed Jun. 30, 2025 in co-pending U.S. Appl. No. 18/135,511.

*Primary Examiner* — David P Porta
*Assistant Examiner* — Fani Polyzos Boosalis
(74) *Attorney, Agent, or Firm* — Nields, Lemack & Frame, LLC

(57) ABSTRACT

There is provided object scanning apparatus and methods of scanning objects. The object scanning apparatus may include a THz source emitting an optical beam; an electromagnetic energy source for generating a radiation signal at a wavelength other than terahertz, such as RF or MMW radiation; an optical system for directing the optical beam; a zone for inspecting objects wherein the optical beam and radiation signal interact with the object; a motion device for changing the spatial or temporal interaction of the object and optical beam and the radiation signal; at least one transducer, the at least one transducer including an imaging transducer for converting the optical beam energy and radiation signal after interaction with the object to an electronic image; and a processor for performing processing of the image for use in characterization of the object or its interior contents or composition.

19 Claims, 15 Drawing Sheets

(56) References Cited

U.S. PATENT DOCUMENTS

| | | |
|---|---|---|
| 2015/0164327 A1 | 6/2015 | Yaroslavsky et al. |
| 2015/0241341 A1 | 8/2015 | Ikeda |
| 2016/0131889 A1 | 5/2016 | Morimoto et al. |
| 2017/0012199 A1 | 1/2017 | Sabry et al. |
| 2019/0196044 A1 | 6/2019 | Marchese et al. |
| 2022/0196869 A1 | 6/2022 | Marchese et al. |

\* cited by examiner

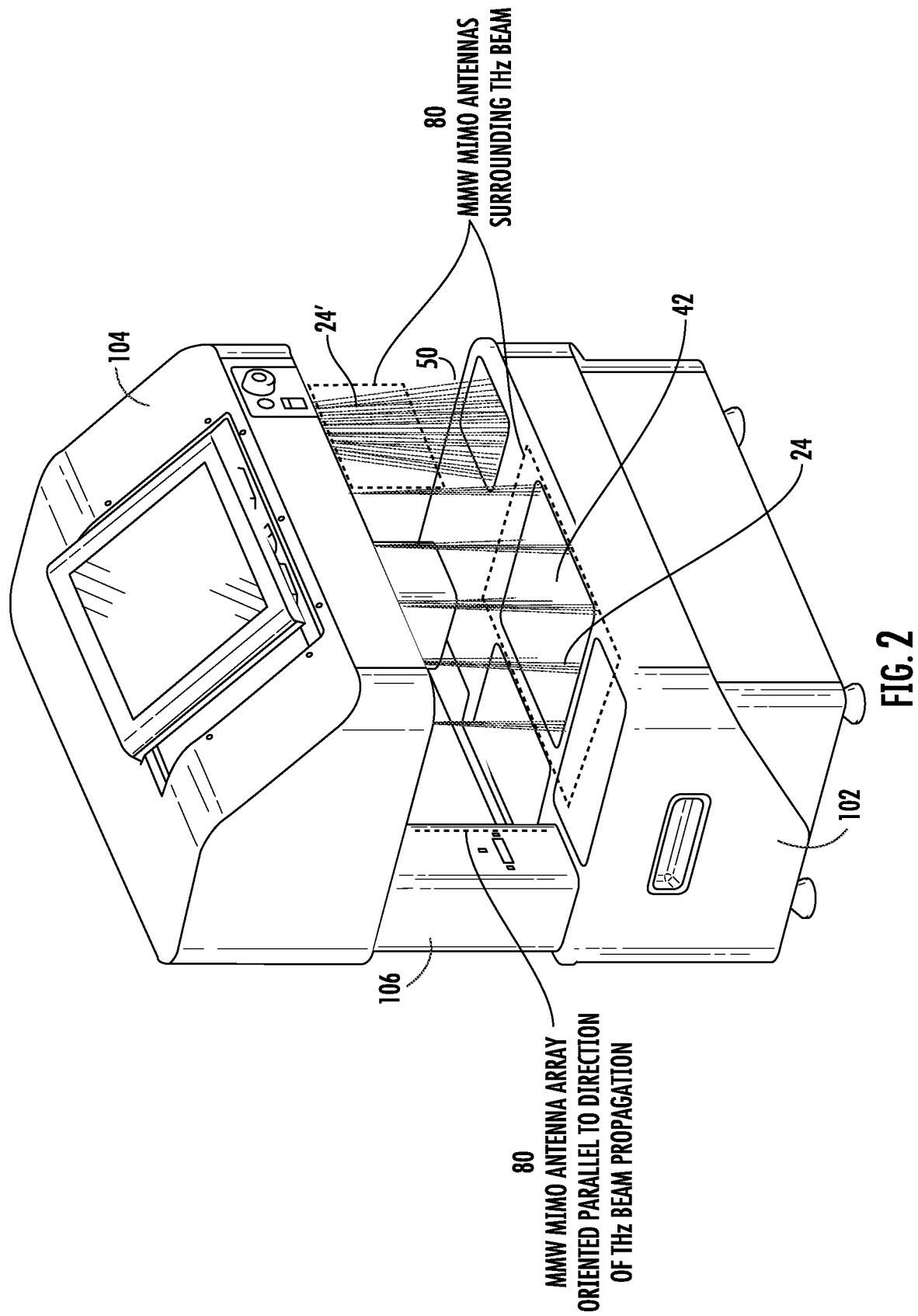

MULTI-MODE OBJECT DETECTION

This application claims priority of U.S. Provisional Patent Application 63/437,419 filed Jan. 6, 2023, the disclosure of which is hereby incorporated by reference in its entirety.

TECHNICAL FIELD

The technical field generally relates to screening of closed containers wherein the container holds one or more objects of interest for detection, characterization and identification, and apparatus for carrying out the same.

BACKGROUND

Container screening is a technique which allows seeing through object carrying containers such as envelopes, small parcels, luggage, shipping containers, and boxes, and thereby enabling the detection and potential identification of hidden items, such as potential or actual hazardous powders (e.g., flour, sugar, baking powder, cocaine, marijuana, tobacco and drugs), liquids (e.g. water or other imbibable fluids, liquid chemicals, biological fluids, fluid mixtures, immiscible fluids, dissolved or undissolved chemicals liquids), in electrical circuits, explosives, weapons, drugs and narcotics, and contraband, all prior to opening the container and exposing these contents. Screening may also be performed for other purposes, including determination or verification of package contents (such as electronic or computer-readable data storage devices, and other electronics), process control, quality control, material inspection and generally applications where it is advantageous to determine what lies within or beneath the visible surface of a container, object or interface. Additional applications include determining whether the contents within a container have been tampered with or modified, such as modification by chemical treatment, environmental exposure, shipping or physical alteration. It is known in the art of such screening to use radiation in the microwave and millimeter wavelengths, for example between 100 μm and 10 mm (or even higher or lower wavelengths depending on application trade-offs of resolution, penetration, and so forth). The penetration depth or transmissivity of the radiation sufficient to see into or through containers of various materials and shapes is known to depend on wavelength in many applications, with longer optical wavelengths generally providing greater penetration at wavelengths longer than visible light. Such radiation will be generally referred to here as container screening radiation (CSR).

There remains a need in the field for improving efficiencies in object detection, characterization and identification by means of an enhanced object scanning apparatus supported by algorithmic based methods, including signal processing or machine learning.

SUMMARY

According to an aspect of the invention, there is provided a multi-mode object scanning apparatus and method of scanning objects. In certain embodiments, the apparatus is a dual-mode object scanning apparatus.

Embodiments disclosed herein are applicable to any object penetrating wavelength wherein the object is characterized by the reflection, transmission or absorption of the radiation by an object, including the object's surface, interior contents or composition. Dual or multi-mode imaging can also be used to augment the performance of the apparatus. For example, terahertz imaging at 300 GHz can be combined with millimeter wave imaging at 60 GHZ and presented to a data analyzer or operator of the apparatus. The design and method of operation of such a dual or multi-mode object scanning apparatus is one aspect of the embodiments described herein. Unless specified more specifically, the descriptions will generally refer to electromagnetic energy that is formed into a beam or otherwise spatially confined energy typically achieved through source emittance directivity, optics, spatial diversity combined with multipath propagation, beam forming and other such techniques as known in the art. Such a beam will typically be used herein for the purposes of container inspection as, for example, with a THz beam or millimeter wave multiple input multiple output array radiation. The CSR electromagnetic energy may be, terahertz (THz) (with suitable frequencies between 300 GHz and 3 THz), millimeter wave (MMW) (with suitable frequencies between 300 MHz and 300 GHz), or radio frequency (RF) bands (with suitable frequencies between 3 kHz and 300 MHZ). A beam may also be formed with a diverging, multi-directional or omnidirectional source of radiation and used for inspection when, for example, optics or antenna are used to collect the radiation after impinging on an object of interest, and in such instances, the beam may be defined by the impinging radiation and/or the optics or other radiation collecting surface.

In certain embodiments, the object scanning apparatus may include a terahertz source for generating a propagated optical beam; a THz inspection zone defined by an in focus region of the propagated optical beam; an electromagnetic energy source for generating a radiation signal at a frequency other than that of the terahertz source, wherein the radiation signal passes through the THZ inspection zone such that objects interact with the propagated optical beam and radiation signal; at least one imaging sensor configured to collect the propagated optical beam after the interacting; and an image processor for taking data from the at least one imaging sensor, and processing the data to determine a characteristic of an object. In some embodiments, the electromagnetic energy source for generating the radiation signal is an RF source, a millimeter wave source, a second terahertz source or a combination thereof. In some embodiments, the electromagnetic energy source for generating the radiation signal has an in focus region that is smaller in volume than the THz inspection zone. In certain embodiments, the electromagnetic energy source for generating the radiation signal has an in focus region that overlaps with the THE inspection zone. In some embodiments, the propagated optical beam has a direction, and the radiation signal is emitted or collected orthogonal to the direction of the propagated optical beam. In some embodiments, the electromagnetic energy source and a second imaging sensor operate in reflection, transmission or both transmission and reflection modes. In some embodiments, the radiation signal is emitted from a handheld device. In some embodiments, the radiation signal is emitted by multiple emitters in a multiple input multiple output configuration. In certain embodiments, the at least one imaging sensor comprises at least one imaging sensor configured to collect the propagated optical beam and at least one radiation signal imaging sensor to collect the radiation signal.

In certain embodiments, the object scanning apparatus may include a terahertz source for generating a propagated optical beam; a THz inspection zone defined by an in focus region of the propagated optical beam; a radiation energy source for generating a radiation signal at a frequency other than that of the terahertz source; a radiation inspection zone defined by an in focus region of the radiation energy source; a THz sensor for collecting the propagated optical beam emitted from the THz inspection zone; a radiation sensor for collecting the radiation signal emitted from the radiation inspection zone; and an image processor for taking data from the THz sensor and radiation sensor of an object within the THz inspection zone and radiation inspection zone, and combining the data from the THz inspection zone and the radiation inspection zone to determine a characteristic of the object. In some embodiments, the radiation signal collected by the radiation sensor passes through the propagated optical beam. In some embodiments, the THz inspection zone and radiation inspection zone overlap. In some embodiments, the propagated optical beam and radiation signal are substantially aligned. In some embodiments, a cross section of the THz inspection zone and a cross section of the radiation inspection zone are substantively orthogonal.

In certain embodiments, the object scanning apparatus may include a terahertz source for generating a propagated optical beam; a THz inspection zone defined by an in focus region of the propagated optical beam; a THz sensor for collecting the propagated optical beam emitted from the THz inspection zone; a radiation energy source for generating a radiation signal at a frequency other than that of the terahertz source; a radiation inspection zone defined by an in focus region of the radiation energy source; a mirror having a reflective surface for reflecting the radiation signal emitted from the radiation inspection zone; a radiation sensor for collecting the radiation signal reflected from the reflective surface; and an image processor for taking data from the THz sensor and radiation sensor of an object within the THz inspection zone and radiation inspection zone, and combining the data from both inspection zones to determine a characteristic of the object. In some embodiments, the radiation signal reflected by the mirror and collected by the radiation sensor passes through the radiation inspection zone. In some embodiments, the image processor calculates from the data collected by the radiation sensor a three-dimensional point cloud and an image plane representative of a relative spatial radiation signal incident on the mirror. In some embodiments, the reflective surface of the mirror has a spatial region wherein the mirror surface varies in height orthogonal to the mirror surface. In certain embodiments, variations of the mirror surface are used to calibrate or characterize the object scanning apparatus.

It will be readily understood that the foregoing embodiments generally describe the combination of a terahertz frequency imaging system and a radiation imaging system at a frequency other than the terahertz frequency, other combinations where the two imaging systems are at two non-overlapping frequencies are within the scope of the invention, including by way of example a MMW imaging system and a MMW radiation imaging system, a MMW imaging system and a THz radiation imaging system, a THZ imaging system and a THz radiation imaging system.

BRIEF DESCRIPTION OF THE DRAWINGS

For a understanding of the present disclosure, reference is made to the accompanying drawings, which are incorporated herein by reference and in which:

FIG. 2 shows dual mode object detection system apparatus in accordance with certain embodiments;

DETAILED DESCRIPTION

Figure 1A:
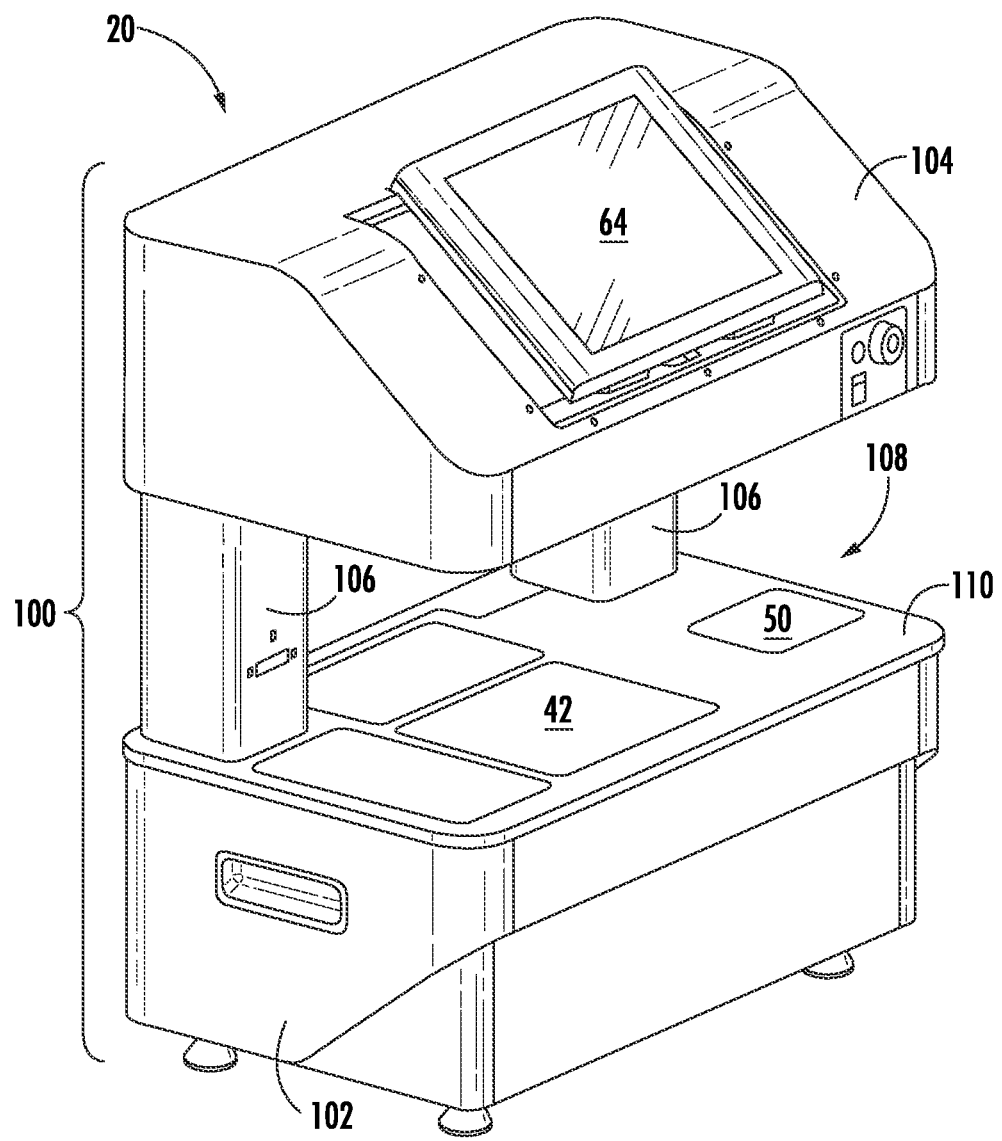
FIGS. 1A-1D show an object scanning apparatus.

"Transducer" as used herein refers to a device that converts energy from one form to another, such as a radiation source that converts conducted electrical signals to radiation or a sensor that converts radiation to an electrical signal. A device that can both emit and sense radiation may also be a transducer (e.g. a transceiver).

"MIMO antennas" (multiple input multiple output) are included herein as a general term, and unless stated more specifically, may also include SIMO (single input multiple output), MISO (multiple input single output) and SISO (single input single output) configurations as known in the art.

Notwithstanding that radar and MMW systems may generate a three dimensional point cloud wherein image cross sections can be extracted along multiple planes, unless specified otherwise as used herein "depth of field" generally means the distance along the general direction of beam or radiation propagation where the image is of useable focus and "cross section" generally refers to the image dimensions orthogonal to beam propagation. "In focus region" generally encompasses the region or three dimensional space wherein the object is in focus along both the depth of field and cross section dimensions.

For purposes of this disclosure, x and y coordinates generally refer to the dimensions orthogonal to the direction of the beam propagation and the z dimension is in the direction of beam propagation. A container object of interest is any substance, feature or other spatially locatable region of interest within the container.

For purposes of this disclosure, the first mode of the dual mode object scanning system will generally be referred to as a THz imaging system and the second mode as an RF (or MMW) imaging system The second mode may also be referred to as a MMW, RF, second mode CSR, or more generally a radiation imaging system of undisclosed CSR frequency (other the first mode imaging frequency), each with respective transmitters, receivers, optics and other such components as known in the art.

In accordance with one aspect of the embodiments disclosed herein, there is provided an object scanning apparatus such as that described in U.S. Pat. No. 10, 247, 842, the disclosure of which is herein incorporated by reference in its entirety, to perform the scanning of containers (or equivalently objects, including objects within containers that may themselves be containers of objects), such as mail, boxes, books and magazines, personal items, luggage and similar objects, using THz imaging. Terahertz inspection is used to detect and localize potential suspicious objects by generating one or more images of the contents inside the container. The screening apparatus includes at least one inspection zone for viewing at least a portion of the container with THz radiation, and typically, a source or transmitter for generating THz radiation, physical optics or phased source arrays for directing the radiation, one or more sensors for detecting the radiation after interaction with the container and any objects therein, and electronics and software for performing signal processing operations and displaying an image to an operator or passing along results to a higher level image processor. In one example, a higher-level image processor may be an expert system such as an artificial intelligence or machine learning system, machine vision system, or similar, and may or may not require interaction with a human operator. In another example, signal conditioning and image processing may also be applied to the images to aid in the detection and identification of objects within the container, the container further containing interfering materials and other objects.

Figure 1B:
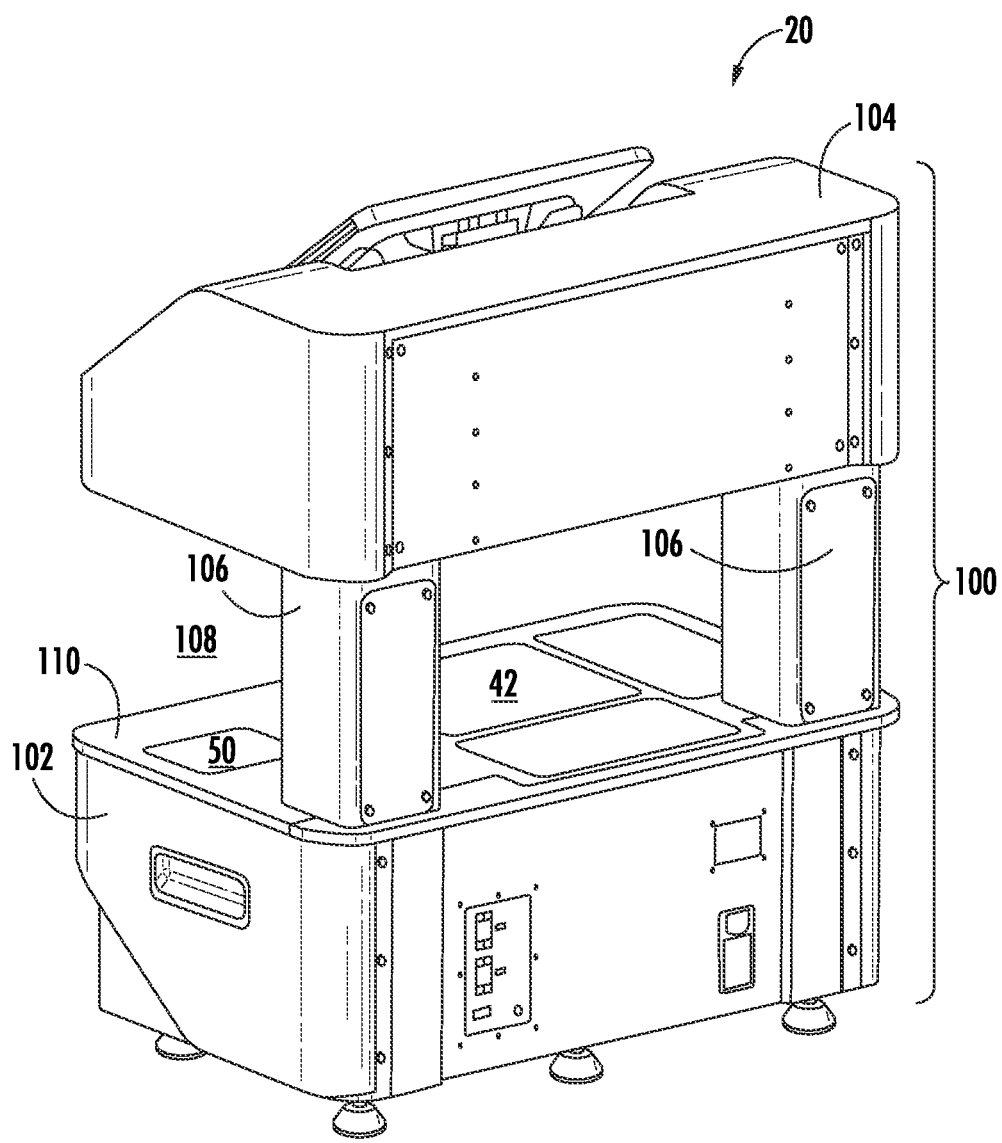

FIGS. 1A-1D show such an apparatus with only a THz generating source (i.e., a second or additional object scanning modes are not shown). Referring more particularly to FIGS. 1A and 1B, the object scanning apparatus 20 is a stand-alone device incorporating all of the components described below in a single casing 100. Preferably, the casing 100 includes a base 102 and a top housing 104 mounted over the base 102 in a spaced-apart relationship, for example using frame members such as a pair of frame posts 106. The free space between the base 102 and the top housing 104 defines an object inspection bay 108. The object inspection bay 108 is preferably large enough to allow the inspected objects to be handled within the bay. The top wall of the base 102 defines an inspection counter 110 on which the object to be inspected can be placed. The inspection counter 110 is separated into different inspection zones, including a primary inspection zone 42 and a secondary inspection zone 50. The inspection counter 110 can support an object to be screened at either one of the primary and secondary inspection zones 42 and 50. As explained further below, the inspection counter 110 allows scanning radiation therethrough at the primary and secondary inspection zones 42 and 50. An opening in the back central section of the base 102, here defined by the free space between the frame posts 106, allows for an optional conveyor belt (not shown).

Figure 1C:
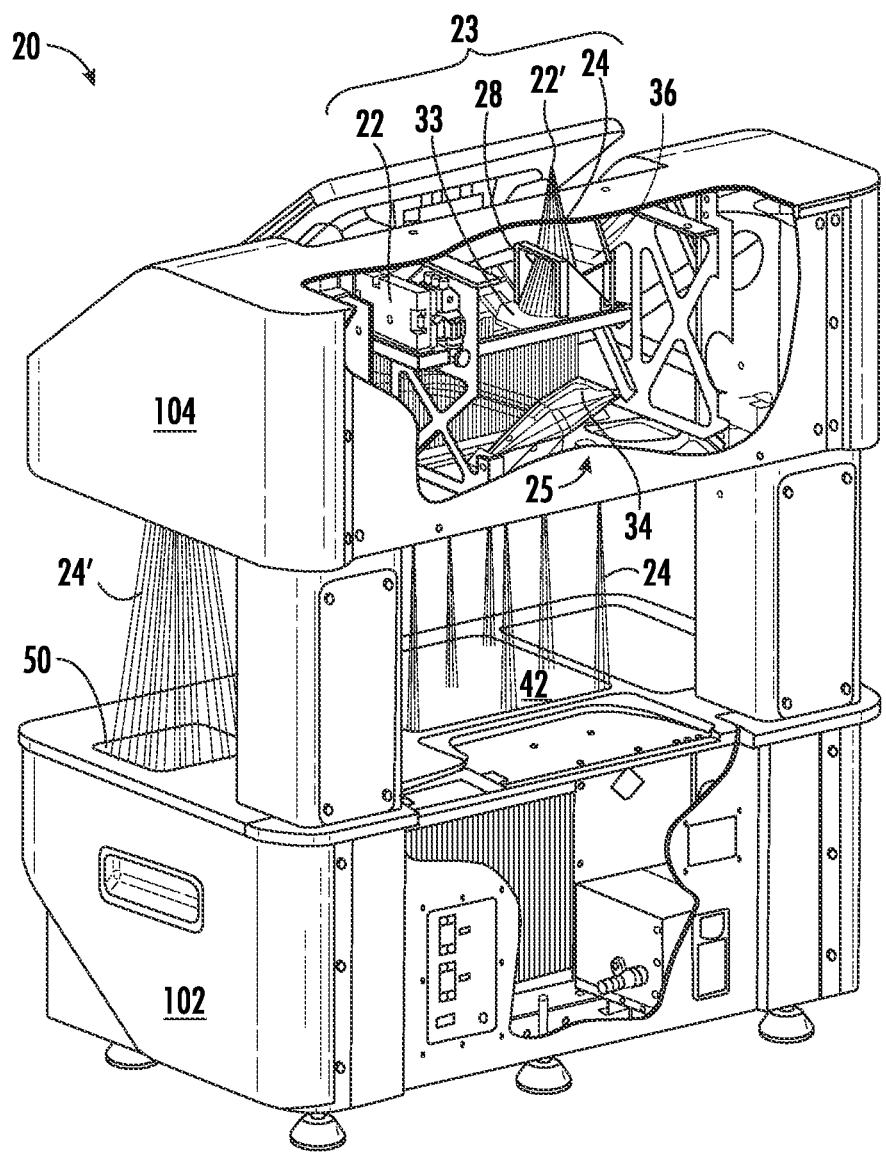
Figure 1D:
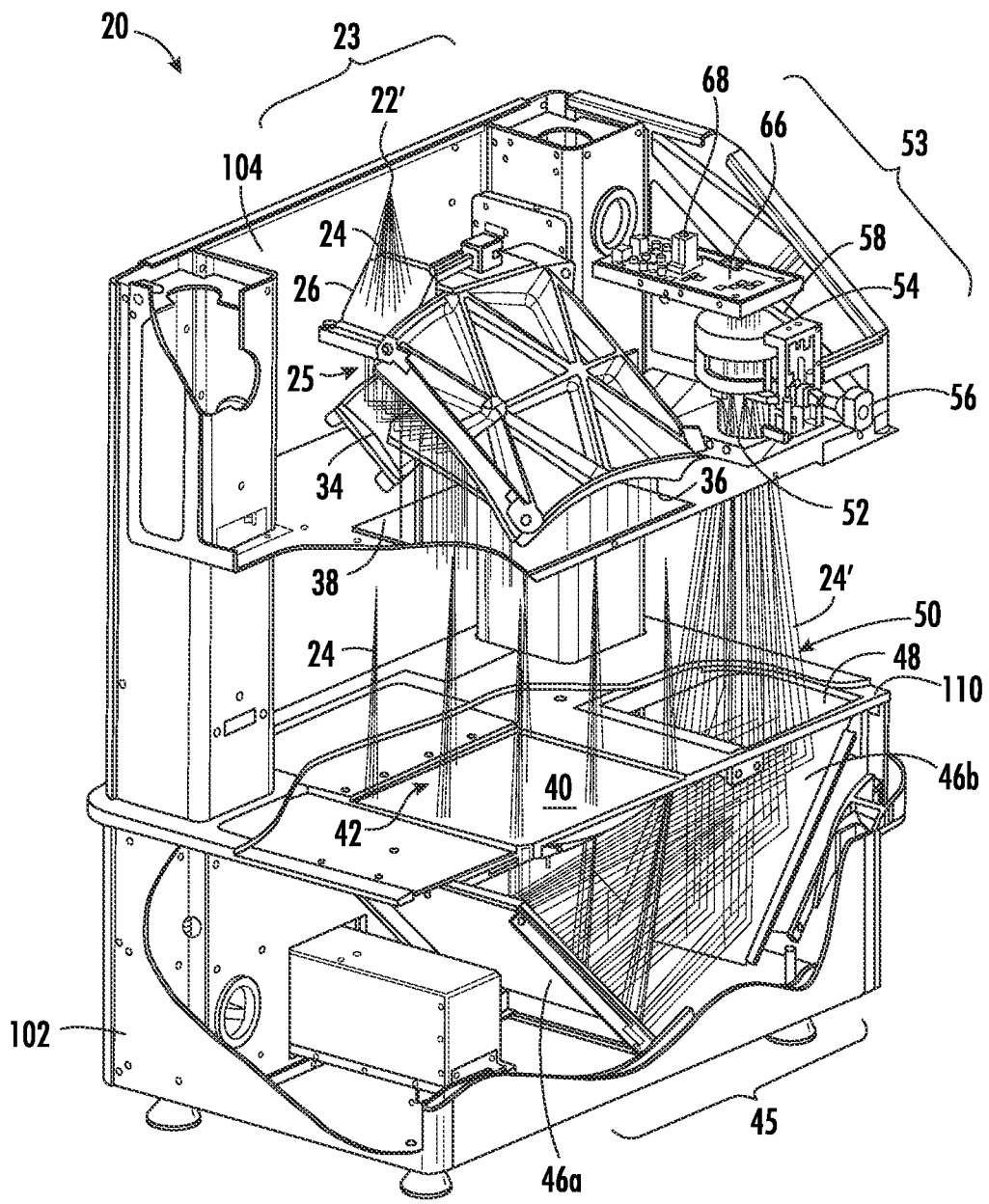

Referring to FIGS. 1C and 1D, the object scanning apparatus 20 includes a THz generating assembly 23 mounted in the top housing 104 and configured to generate an inspection optical beam 24 and project the inspection optical beam 24 into the base 102 through the primary inspection zone 42. In the illustrated embodiment, the THz generating assembly 23 first includes a THz source 22 mounted within the top housing 104 and emitting the inspection optical beam 24 (referred to hereinbelow as the "optical beam" for simplicity). In some implementations, the THz source 22 emits light at an optical frequency in the terahertz range, for example at a frequency corresponding to a wavelength between 700 μm and 1075 μm. In some implementations, the optical frequency of the inspection optical beam may correspond to a wavelength between 50 μm and 3 mm. It will be readily understood by one skilled in the art that the term "THz source" is meant to encompass stand-alone devices as well as more complex optical assemblies or systems comprising a plurality of components cooperating together to provide the desired optical beam. An example of commercially available THz sources that may be used in some implementations includes a Gunn oscillator from Sage Millimeter Inc. combined with frequency doublers and triplers from Virginia Diodes Inc. emitting power above 2 mW at a wavelength of 1.06 mm, with an antenna also from Virginia Diodes. In other embodiments, the THE source may, for example, be a Schottky diode or a GaAs diode emitting radiation at a suitable wavelength.

The THz generating assembly 23 may next include any number of optical components in a path of the optical beam 24 for shaping, collimating and redirecting the optical beam 24. In the present example, the THZ assembly generating 23 includes a beam conditioning assembly or optical element(s) 25 within the top housing 104 which shapes and expands the transverse irradiance profile of the optical beam 24 radiated by the THz source 22. In one implementation, the optical beam 24 has a footprint between 125 mm and 400 mm. In some implementations, the beam conditioning assembly 25 may favor a uniform irradiance distribution along the transverse plane of the optical beam 24.

In the illustrated embodiment of FIG. 1C, the beam conditioning assembly or optical element(s) 25 includes a convex mirror 34 and a concave mirror 36 successively disposed in a path of the optical beam 24. The shapes of the convex and concave mirrors 34 and 36 are preferably computed to transform the transverse spatial energy distribution of the optical beam from a Gaussian initial shape with an elliptical footprint, as typically characterizing optical beams emitted from the type of THz source used herein, to a flat-top final shape with a rectangular footprint. The local curvature of the convex mirror 34 is designed to control the intensity distribution of the optical beam. The concave mirror 36 reflects the divergent optical beam 24 from the convex mirror 34 so that, as a result, the optical beam 24 reflected off the concave mirror 36 is collimated and has a propagation axis parallel to its propagation axis prior to reflection on the convex mirror 34.

The beam conditioning assembly 25 (also referred to as illumination optics) may further include a first mirror 26 positioned at an angle of 45° with respect to the propagation axis of the optical beam 24 impinging thereon from the THz source 22 upstream from the convex and concave mirrors 34 and 36. It will be noted that for clarity, the portion of the optical beam 24 extending between the THz source 22 and the first mirror 26 is not shown, replaced instead by the virtual image 22' of the source on the side of the first mirror 26 opposite its reflecting surface 28. In some implementations (not illustrated), the first mirror 26 may be a coherence-breaking mirror having a reflective surface provided with a structured pattern (not shown). The structured pattern may for example be composed of a plurality of sloped elements distributed over the reflecting surface, each sloped element deviating the beam component of the optical beam incident thereon at a slightly different angle than the deviation imparted on neighboring beam components by neighboring sloped elements. Reflection of the optical beam by the sloped element therefore breaks the spatial coherence of the optical beam. The slope of each sloped element may be computed to deviate the beam component of the optical beam incident thereon by an angle smaller than the divergence of the optical beam. In further variants, the coherence-breaking mirror may be mounted on a rotating mount (not shown), preferably operated by a motor. In this variant, the coherence-breaking mirror is therefore rotatable about a rotation axis normal to its reflecting surface, thus breaking the temporal coherence of the optical beam reflected thereon.

In the illustrated embodiment of FIG. 1C, a collimating lens 33 is disposed on the optical path downstream the reflection on the first mirror 26, The collimating lens 33 may for example be embodied by a spherical or aspherical lens, and transforms the optical beam 24 into a slowly-diverging beam. It will be readily understood that other configurations can be considered and that additional optical elements may be provided in the path of the THz optical beam as part of the beam conditioning assembly without departing from the scope of the embodiments disclosed herein.

As best seen in FIG. 1D, the optical beam 24 exits the top housing 104 through an output window 38 provided underneath the top housing 104. The output window 38 is preferably made of polyethylene, glass, or other suitably transparent material. The output window 38 can advantageously protect the optical components within the top housing 104 from dust or other contaminants. In some embodiments, the output window may be omitted.

The optical beam 24 travels downward from the output window 38 towards the base 102 of the casing 100, where it reaches a primary inspection window 40 provided in the inspection counter 110 and vertically aligned with the output window 38. The space immediately above the primary inspection window 40 within the path of the optical beam 24 (and within the path of the radiation signal from the radiation source other than THz, not shown in FIG. 1D) defines the primary inspection zone 42 for the object to be inspected. The portion of the optical beam 24 transmitted through the object to be inspected and the primary inspection window 40 therefore contains imaging information on the contents of the object, which can be processed as explained further below. In some implementations, the primary inspection zone 42 has a large imaging area. One example of an imaging area suitable for object inspection can be around 9.5 inch by 7.125 inch. The primary inspection window 40 may also be made of polyethylene, glass, or other suitably transparent material. Preferably, the primary inspection window 40 has a curvature designed to act as a field lens in order to collect more energy from the optical beam 24 transmitted through the object provided within the primary inspection zone 42. As will be explained in further details below, the primary inspection window 40 is preferably located at an imaging plane so that when an object for inspection is placed in the primary inspection zone 42 its image will be in focus on the image sensor. In one embodiment, the inspection zone is defined by the in focus region of the optical beam 24 wherein objects interact with the optical beam 24.

In certain embodiments the object scanning apparatus 20 further includes a light redirection assembly 45 provided in the base 102 and configured to redirect the inspection optical beam 24 entering the base 102 from the primary inspection zone 42 to emerge through the secondary inspection zone 50 and project towards the top housing 104. Referring to FIG. 1D, in the illustrated embodiment the light redirection assembly 45 includes a pair of folding mirrors 46a and 46b, mounted at opposite 45° angles with respect to the plane of the inspection counter 110. The folding mirrors 46a and 46b are preferably planar mirrors, Reflection on both folding mirrors 46a and 46b redirects the optical beam 24 upwards at a location offset the primary inspection zone 42, where it exits the base 102 through a secondary inspection window 48 mounted in the inspection counter 110, The secondary inspection window 48 may also be made of polyethylene, glass, or other suitably transparent material. The space above the secondary inspection window 48 within the path of the optical beam 24 defines the secondary inspection zone 50, spanning a narrower imaging area than the primary inspection zone 42. The object to be inspected can therefore be placed in the secondary inspection zone 50 to provide a zoomed image of a portion of the object.

Referring again more particularly to FIG. 1D, after crossing the secondary inspection zone 50, the optical beam re-enters the top housing 104, which is preferably provided with an input window 52. The input window 52 may also be made of polyethylene, glass, or other suitably transparent material. In other variants the input window may be replaced by a suitably sized pass-through opening.

In certain embodiments, the object scanning apparatus 20 further includes a light collecting assembly 53 mounted in the top housing 104 and configured to receive and detect the inspection optical beam 24 projected from the base 102 through the secondary inspection zone 50. Still referring particularly to FIG. 1D, in the illustrated example, the optical beam 24 is collected by an objective optics 54. In one implementation, the objective optics 54 includes a fast objective lens having an f-number (E/#) preferably lower than f/1.2. A focus adjusting mechanism is provided to adjust the focus of the light collecting assembly 53 on either the primary or the secondary inspection window 40 or 48, depending on the inspection zone being used. In the illustrated variant, the focus adjusting mechanism is a focus adjuster embodied by a rotating handle 56 operatively connected to the objective optics 54, but it will be readily understood that other means for setting the focus, mechanically or electrically, can be used without departing from the scope of the invention.

Still referring to FIG. 1D, the light collecting assembly 53 further includes an imaging sensor 58 positioned to receive and detect the light collected by the objective optics 54. The imaging sensor 58 preferably comprises a 2D image sensor preferably sensitive in a suitable portion of the wavelength region spanning from 700 μm to 1075 μm and preferably with a resolution of at least 320×240 pixels. An example of a suitable image sensor is the one used in the IRXCAM-384 THz camera module available from INO (Quebec, Canada), sensitive to the THz waveband.

As best seen in FIG. 1A, a display 64 is preferably provided to allow a user to visualize the inspection results of an object positioned in either one of the inspection zones 42, 50. The display 64 is preferably integrated in a front portion of the top housing 104 for easy viewing by a user positioned in front of the object scanning apparatus 20. The display may be embodied by a LCD screen, a touchscreen, etc. The display 64 may be mounted on the top housing 104 so as to be pivotable along at least one axis, to adapt to the position of the user in front of the object scanning apparatus 20. In some implementations, the display 64 may be omitted from the object scanning apparatus and a connection to a separate visualizing device may be provided instead.

In certain embodiments the object scanning apparatus 20 further includes a controller 66. The controller 66 is configured to perform a variety of control functions, such as, non-limitatively:

a. Acquiring the image data from the imaging sensor(s); and b. Preprocessing and formatting of the image data.

An image processor 68 is preferably provided on the controller 66 and is provided with operating software configured to perform various processing functions, such as, non-limitatively:

a. Postprocessing of the image data acquired by the imaging sensor(s) (e.g. edge enhancement and machine learning functionality);

b. Displaying of the acquired and processed images on the display;

c. Saving the images in memory; and d. Linking the system to an ethernet or WiFi output for remote control.

Further, the controller 66 is also adapted to perform all of the functions described herein.

It will be readily understood that the controller 66 and image processor 68 may be embodied by a variety of devices, modules and combinations thereof without departing from the scope of the embodiments disclosed herein.

In certain embodiments the object scanning apparatus 20 may be provided with any suitable user interface components providing for an easy interaction with a user. In one example, the display 64 may be embodied by a touchscreen configured to provide the user with controls and options for using the object scanning apparatus 20. Alternatively or additionally, the object scanning apparatus 20 may be provided with keys, buttons, switches, pads, or any other user interface implements well known in the art.

As described above, terahertz inspection is used to localize objects by generating one or more images of the contents inside the container. As noted above, in certain embodiments, the object scanning apparatus 20 includes at least one inspection zone for viewing at least a spatial portion of the container with THz radiation, and typically, a source or transceiver for generating THz radiation, physical optics or phased source arrays for directing the radiation to the inspection zone, physical optics or phased receiver arrays for receiving the radiation from the inspection zone, a sensor or transceiver for detecting the radiation after interaction with the container and any objects therein, and electronics and software for performing signal processing operations and displaying an image to an operator or passing along results to a higher level processor. Signal conditioning and image processing may also be applied to the images to aid in the detection and identification of objects within the container, the container further containing interfering materials and other objects. In certain embodiments, the inspection zone is defined by an inspection surface (e.g. inspection window above or below) and the substantively in-focus three dimensional region of the THz radiation formed by optics into the optical beam 24 or equivalently radiation field.

The embodiments disclosed herein are applicable to radiation other than THz radiation as defined in the art (i.e., less than or more than 300 GHz-3 THz), and thus it should be understood that embodiments are more broadly applicable to any object penetrating wavelength wherein the object is characterized by the reflection, transmission or absorption of the radiation by the object, including the object's interior contents or composition.

Figure 3:
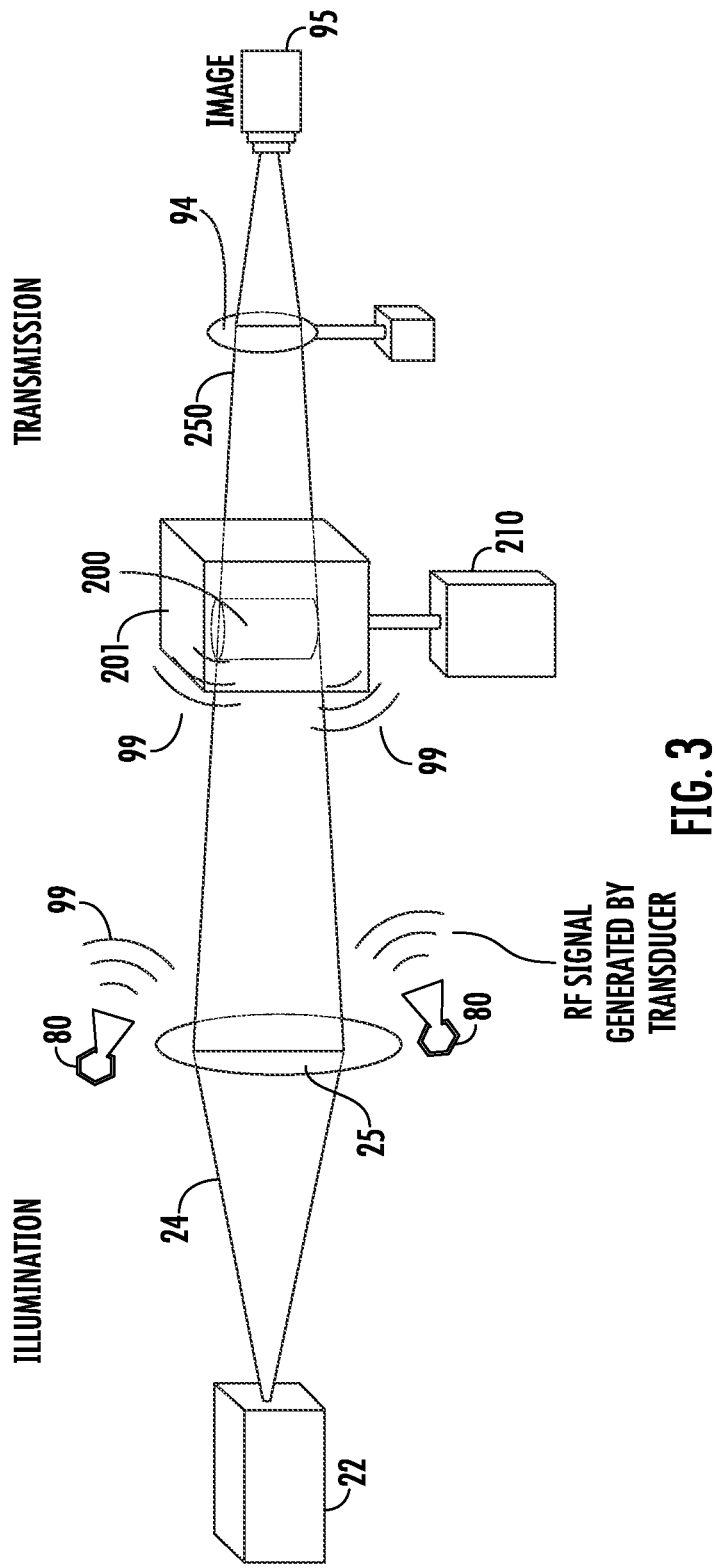
FIG. 3 shows dual mode imaging components in accordance with certain embodiments.

FIGS. 2 and 3 show a multi-mode embodiment comprised of a THz imaging apparatus (as described in part in copending U.S. patent application Ser. No. 18/135,511 filed on Apr. 17, 2023, incorporated herein by reference), wherein additional one or more RF or MMW transmitters, receivers or transmitter/receiver modules are placed such that the container under test is inspected by both second mode CSR (e.g. RF, MMW) and first mode THz imaging modalities within the inspection region of an object scanning apparatus. In FIG. 2, the apparatus includes top housing 104 containing a THz radiation source and THz radiation receiving imaging sensor (not shown), a primary or first inspection zone 42 with an inspection optical beam 24 that is a substantially collimated THz beam, a secondary inspection zone 50 with a converging THz beam 24', the collimated and converging THz beams first generated by the THz radiation source 22 as discussed with reference to FIGS. 1A-1D. In one embodiment, where the THz beam is not substantively collimated, at least some portion of the inspection zone is in focus for one or both of the THz imaging system and second mode CSR imaging system modalities.

In certain embodiments, multiple radio frequency (RF) or millimeter wave (MMW) transducers 80, which may be transmit antennas or receiver antennas, in a MIMO (multiple input multiple output) architecture as known in the art, may be placed around or in close proximity to the beam conditioning assembly 25 of optical element(s) of the THz imaging system (e.g., a lens, window or reflector) such that the views of the container are substantially aligned and in focus, thereby enabling a signal processing system to process the RF (or MMW) and THz signals to generate a combined (or fused) image of the container from similar orientations and perspectives, even as the container is moved relative to the RF (or MMW) and THz beams. As shown in FIG. 2, the MMW transducers 80 may be oriented parallel to the direction of the inspection optical beam 24 such that reflected MMW radiation substantially aligned (or parallel within 45 degrees), to the direction of the inspection optical beam 24 is collected by the MMW receivers, or more generally, transducers 80 may be at any orientation and positioning relative to the direction of the THz optical beam propagation. In certain embodiments, the MMW transducers 80 may surround the inspection optical beam 24, such that the reflected MMW radiation collected by the MMW receivers has been reflected substantially orthogonal (i.e. at an angle between 45 degrees and 90 degrees) to the optical beam direction of propagation. In certain embodiments, the MMW transmitters may emit MMW radiation in a direction substantially parallel to the inspection optical beam 24 and the MMW radiation collected by the MMW receivers may be reflected MMW radiation propagating to the receivers from a direction substantially parallel to the inspection optical beam 24. In certain embodiments, a MMW view is generated from reflected MMW signals and a THz view is generated by transmitted THz signals. In another embodiment with different MMW transducer placement, an MMW view may be generated from transmitted signals and in yet another embodiment, a MMW view may be generated from transmitted and reflected signals. Similarly, a THz view may be generated from reflected, transmitted or reflected and transmitted signals by placement of imaging sensors or transducers.

The multiple transducers 80 may be placed to image within the primary inspection zone 42, the secondary inspection zone 50, or both. The radiation source or sources other than THz may be RF or MMW (e.g., at a frequency between 30 KHz and 300 GHz), THz, or any combination of the foregoing.

Returning specifically to FIG. 3, the dual mode imaging system apparatus shown includes THz radiation source or sources 22 of an illumination beam, illumination (e.g., collimating) optical element(s) 25, an inspection container 201 with an object or substance of interest 200 therein, a transmitted THz beam 250 after passing through or around the container 201, objective optics 94, and a radiation sensor or sensors 95. The apparatus further includes one or more RF (or MMW) transducers 80 for generating and receiving an RF signal 99 reflected from the container 201 or object 200 therein.

The embodiment of FIG. 3 may also include one or more mechanisms or actuators 210 for changing the location or orientation of the container 201 with respect to the THz beams or RF radiation, as more fully described in the aforementioned co-pending U.S. patent application Ser. No. 18/135,511.

Figure 4:
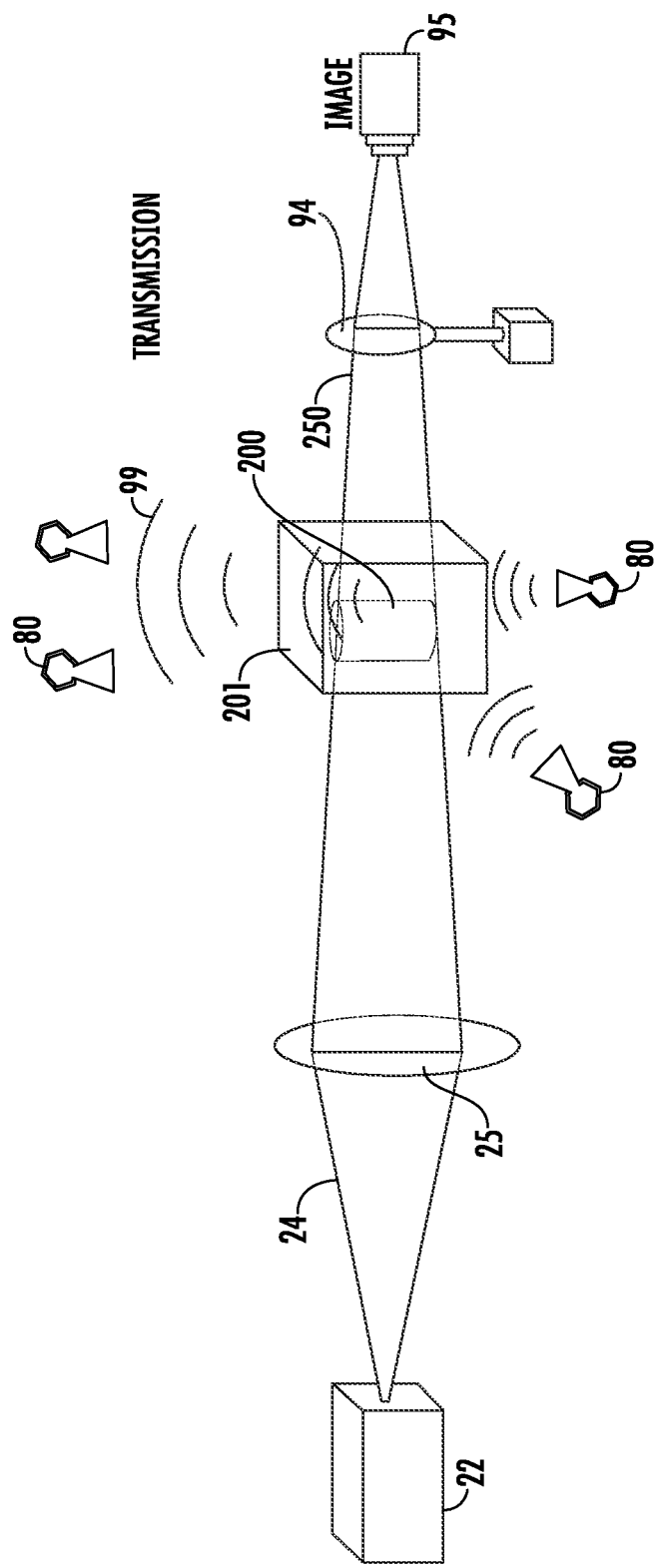
FIG. 4 shows orthogonal dual mode imaging components in accordance with certain embodiments.

In the embodiment of FIG. 4, the RF transmit/receive signals 99 are orthogonal to the direction of the transmitted THz beam 250, and transmitters and receivers may be placed on two or more sides of the inspection optical beam 24 such that they may operate in reflection, transmission or both transmission and reflection. In the embodiments of both FIG. 3 and FIG. 4, the THz and RF imaging systems may image simultaneously or sequentially in time, or with asynchronous or synchronous timing of data acquisition (e.g. frame rate), depending on the characteristics of the object under test or its motion relative to the inspection zone.

"Periphery" of a THz beam as used herein is intended to indicate locations that are spatially close to but outside of the "edge" of the energy distribution of THz beam wherein such locations do not create interactions with the THz beam in a manner that is substantially detrimental to the transmitted THz signal level or quality of the THz signal for purposes of display or image processing.

Figure 5:
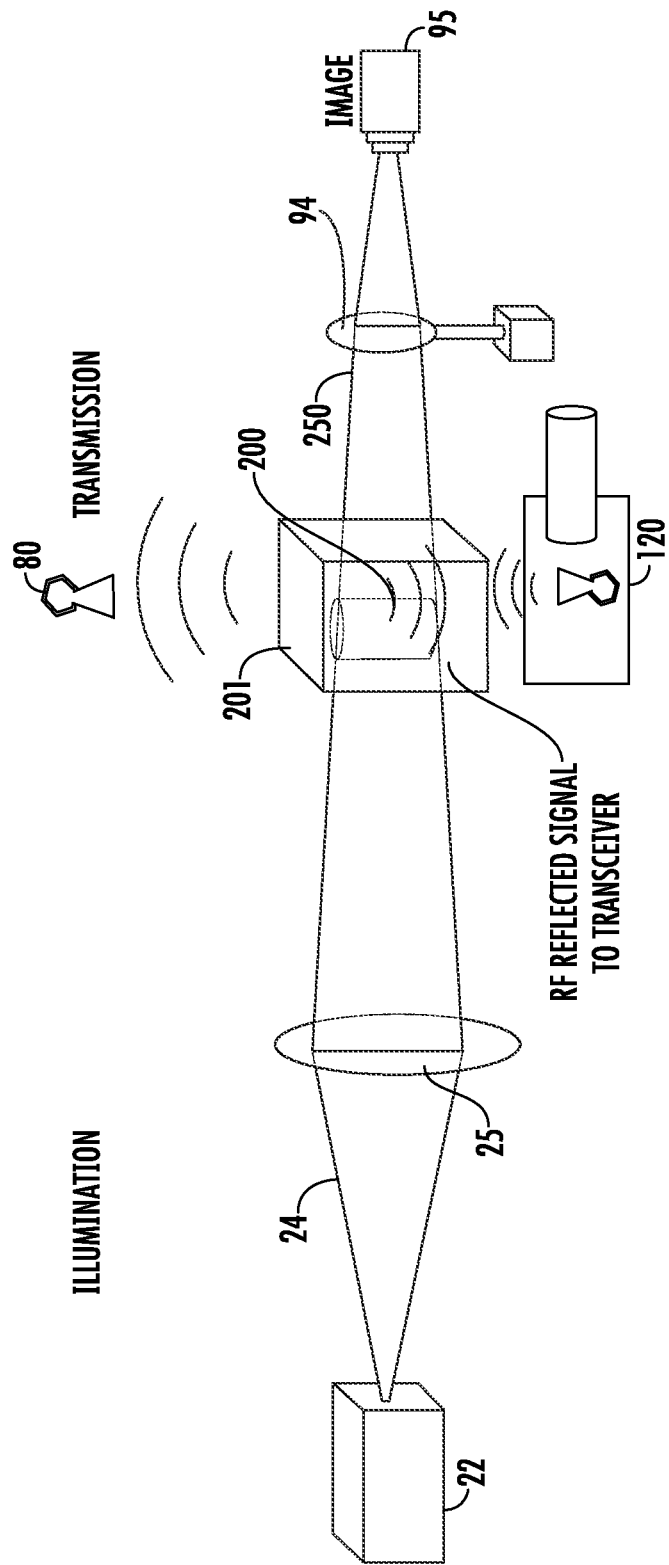
FIG. 5 shows an orthogonal dual mode imaging system with a handheld dock apparatus in accordance with certain embodiments.

FIG. 5 illustrates an embodiment where the radiation signal (e.g., RF, MMW) transmit/receive modules may be incorporated into a removable handheld apparatus 120, such as a wand or the like, that may be dockable into the object scanning apparatus. A method of operating the scanning apparatus of FIG. 5 may include the following steps:

1. Characterizing a container 201 with a dual mode (e.g., THz and second mode CSR frequencies) imaging, one of the dual modes including a handheld apparatus 120 capable of transmitting, receiving, or transmitting and receiving its second mode CSR radiation;
    a, wherein the spatial orientation of the two modes is fixed in time and space (e.g., the handheld apparatus 120 is docked into the object scanning apparatus 20 by any suitable means);
2. Processing of the dual image to determine the spatial location of a container 201, or substance or object 200 therein;
3. Removing the handheld apparatus 120 from its docked position and imaging of the container 201 from a second spatial location different from the docked spatial location using the second mode CSR of the handheld apparatus 120;
4. Combining the first and second mode images to generate a combined image of the container 201 or object(s) 200 therein for viewing by an operator or subsequent image processing;
5. Changing the position of the handheld apparatus 120 over time and continuously generating a combined dual mode image;
6. Using the dual mode image generated in the docked location to determine a recommended spatial location for imaging of the hidden container object 200 to provide a desired representation for the characterization of container object 200 in the undocked location, and communicating such location to an operator of the handheld apparatus 120;
7. Using a three-dimension dual mode image generated in the docked location and the single mode imagery of the handheld apparatus 120, determine a spatial location and orientation of the handheld apparatus 120 that provides the desired representation for the characterization of container object 200;
8. Using the spatial location determined above to recommend a new spatial location and orientation of the handheld apparatus 120 to the operator;
9. Using orientation sensors (e.g. accelerometers or optical sensors, and the like) within the handheld apparatus 120 to determine a relative spatial location of the handheld apparatus 120 relative to the spatial location of the non-handheld beam to achieve an image representation for characterization of container object 200; and
10. Using a single mode image to determine a recommended spatial location for imaging of the hidden container object 200 to provide a desired representation for the characterization of container object 200 in the undocked location, and communicating such location to an operator of the handheld apparatus 120.

In certain embodiments, the transducers 80 (which may be RF transducers or other radiation sources) are placed within the periphery of the THz beam, resulting in an interaction of the RF transducers and THz beam. Such interaction may result in partial occultation or diffraction of the THz beam that is measurable by the THz sensor 95. Motion of the THz beam relative to the RF transducers 80 may be used to detect the interaction of the THz beam with the RF transducers 80. A signal processor may be used to remove the contribution of the RF transducer interaction from the THz sensor signal when further used in signal or image processing.

Figure 6:
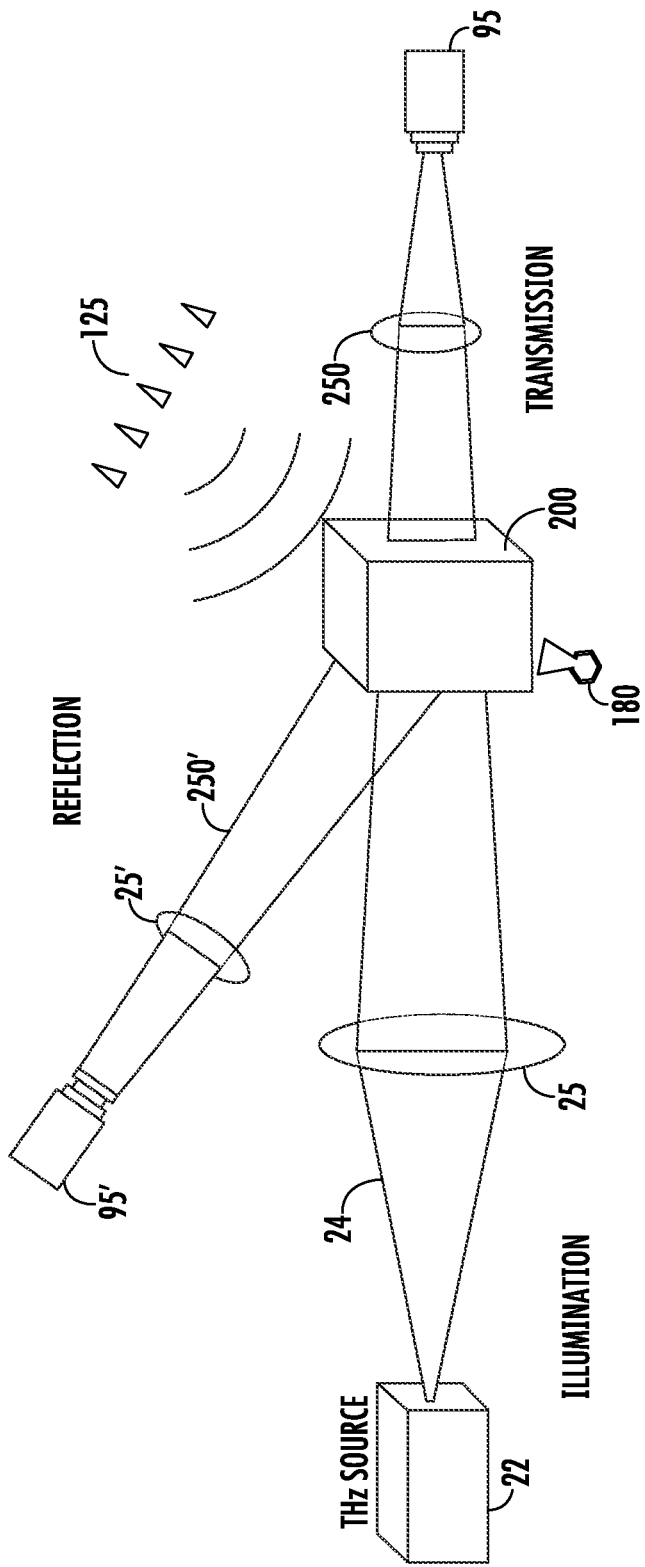
FIG. 6 shows transmission-reflection imaging apparatus in accordance with certain embodiments.

FIG. 6 shows an embodiment with both a reflected and transmitted THz beam, using a second set of THz objective optics 25' and a second imaging sensor 95' (e.g., a THz imaging camera), wherein the THz beam is transmitted through the object 200 to the first imaging sensor 95 and reflected off the object 200 to the second imaging sensor 95'. In certain embodiments, the apparatus of FIG. 6 includes a MIMO MMW imager 125 operating in reflection and additional MMW receivers 180 operated to receive a transmitted MMW signal from the MIMO MMW imager with electrical connections between the MMW transmitters and receivers for synchronization. The illumination optics 25 may be a series of lenses or mirrors depending at least in part on the specific imaging requirements. Reflection and transmission may be performed simultaneously using two THz cameras or separately by displacing a single camera.

Figure 7:
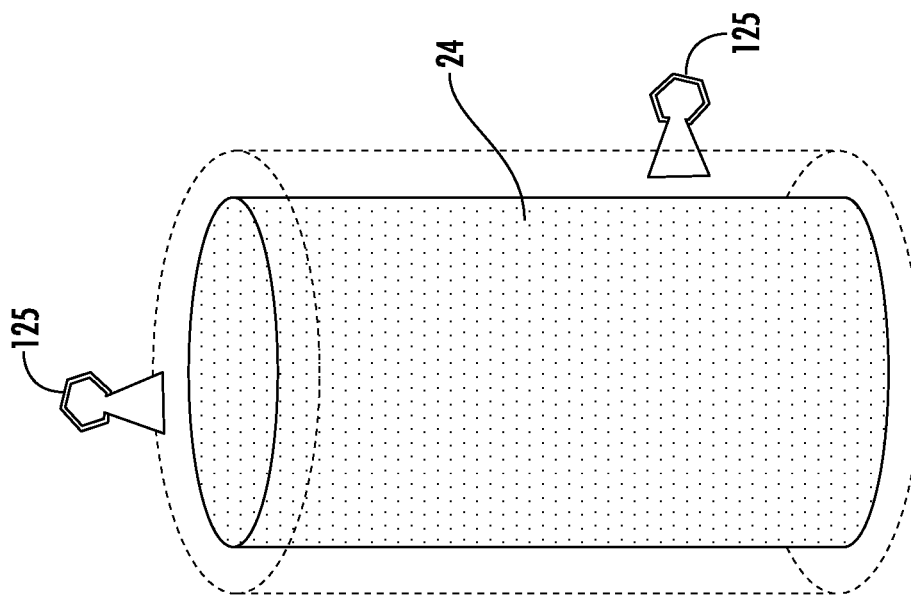
FIG. 7 shows a beam and antenna placement in accordance with certain embodiments.

FIG. 7 shows an embodiment with a collimated THz optical beam with MMW transducers 125 located on the periphery of the inspection optical beam 24. The transducers as shown may be pointed in a plane that orthogonal or parallel to the direction of propagation of the THz beam as shown in FIG. 7, and may be distributed as transmitters, receivers, SIMO, MIMO or other such components as known by those skilled in the art.

Referencing FIGS. 3, 4, 5, 6 and 7, other dual mode embodiments may include the following:

An object scanning apparatus with:
    an inspection zone defined by a first surface (e.g. THz window, optical element surface or other THZ transmitting surface), a second surface (e.g. THz window, optical element surface, or other THz transmitting or reflective surface), and a THz beam; wherein the THz beam is substantially collimated throughout the inspection zone to provide an in-focus THz image of an object throughout the inspection zone when using a THz sensor;
    millimeter wave (MMW) MIMO antennas located on the periphery of the THz beam to provide an in-focus MMW image of an object within the inspection zone; and signal processing electronics to process the signal data from the THz sensor and MMW antennas to generate respective images for viewing or image processing.

The imaging system embodiment as just described may further comprise one or more of the following:

MMW antennas spatially placed in a configuration around a THz beam in the form of an arc, a circle, a square, a line, orthogonal rows, or a rectangle (e.g., FIG. 7);

transmit antennas in one configuration and orientation and receive antennas in a second configuration and orientation relative to the transmit antennas;

MMW radiation signals that are emitted or collected substantively orthogonal to the direction of the propagated optical beam;

the transmit and receive orientations being orthogonal to each other;

more than one set of transmit antennas, receive antennas, or both, wherein a first set may operate independently from a second set in either a synchronous or asynchronous manner. The receive signals from the sets may be combined in a signal processor with the THz data for subsequent display or image processing. The two sets may operate at different frequencies, number of antenna, and spatial positioning of antenna to provide variation in object penetration and resolution.

Figure 8:
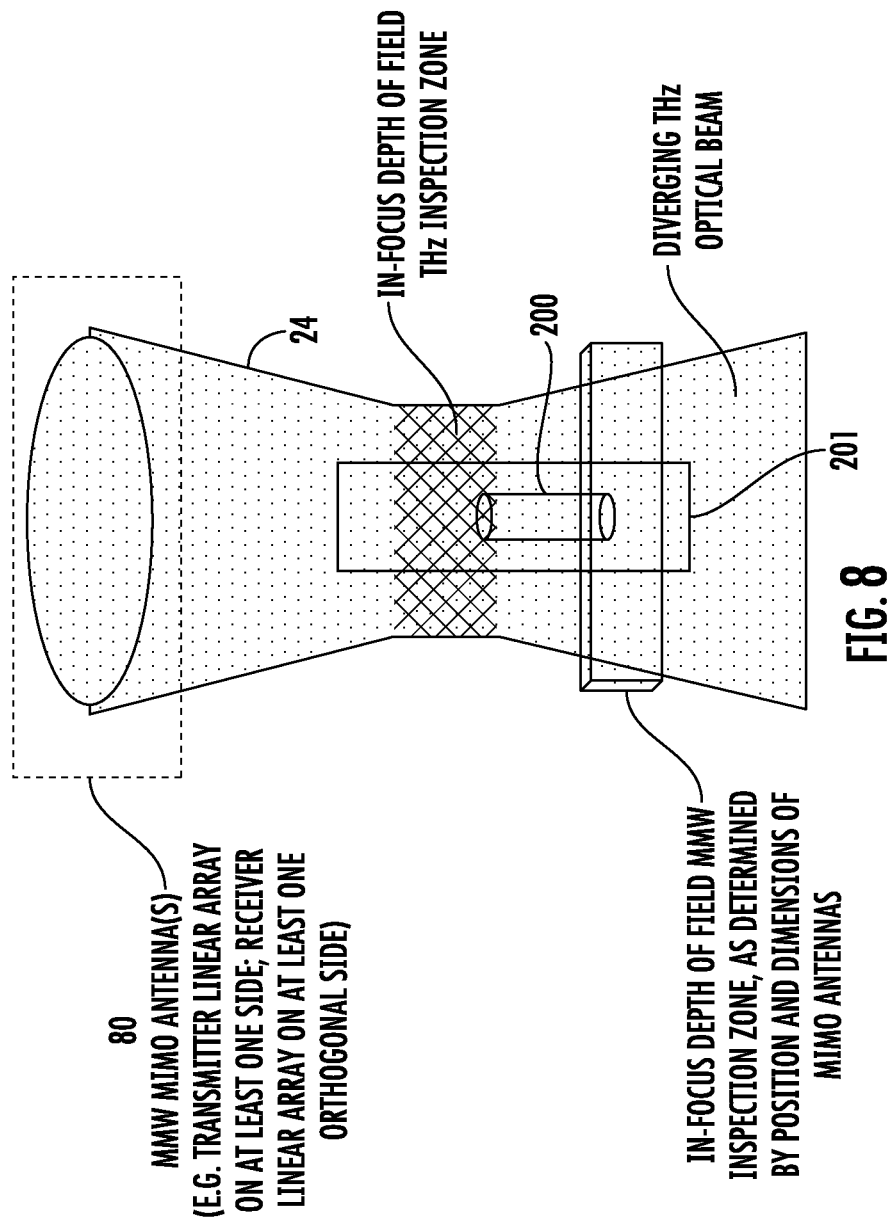
FIG. 8 shows dual mode inspection zones in accordance with certain embodiments.

The imaging system of any one of the foregoing embodiments may still further comprise one or more of the following:

MIMO antennas (or other configurations of transmit and receive antennas) placed in proximity to the first or second inspection surfaces, or both;

separation of transmit and receive antennas, one type on each surface;

an in-focus depth of field of the MMW radiation beam in the direction of propagation of the THz beam that is less than the separation of the first and second inspection surfaces (e.g. in-focus in only part of the inspection zone) (FIG. 8);

wherein the MMW in-focus depth of field includes the first or second inspection surface;

wherein the MMW in-focus depth of field does not include the first or second inspection surface, and an inspection object with a dimension in the direction of propagation larger than the MMW in-focus depth of field is moved (1) within the inspection zone, or (2) the position of the MMW in focus region is moved relative to the object or inspection zone, all such that in-focus MMW data of the object can be obtained (e.g. by stitching) for an object region that exceeds the MMW depth of field;

wherein an actuator or hand movement provides the relative motion between object and MMW beam;

wherein a change of the position of the MMW beam in-focus region is achieved by selection of antennas or motion of the antennas relative to the inspection zone;

wherein in-focus THz imagery is obtained throughout the range motion of the object within the inspection zone;

wherein in-focus THz imagery is obtained throughout the relative range motion of the object within the MMW in focus region;

wherein the MMW in-focus region is moved to provide for collection of in-focus MMW data at both the first and second inspection surfaces;

wherein the in-focus region provides for in-focus data for all of the inspection zone.

The imaging system may yet still further comprise one or more of the following:

MIMO antennas (or other configurations of transmit and receive antennas) placed in an orientation along the direction of propagation of the THz beam (see FIGS. 2, 3 and 7);

wherein the antennas are placed within a support structure that determines the spacing between the first and second surfaces (FIG. 2);

wherein the antennas are placed within multiple support structures that determine the spacing between the first and second inspection surfaces (FIG. 2);

wherein the antennas so placed are either transmit or receive antenna types, and are orthogonal to the other type of antenna;

The imaging system of any one of the foregoing embodiments may even further comprise one or more of the following:

MMW image of an object's location and the intensity of a reflected RF signal results from using one or more methods, such as, but not limited to, delay and sum, back projection algorithm, or range migration algorithm;

The in-focus MMW region is orientated to provide an image cross section of the object perpendicular to the direction of propagation of the THz beam;

The in-focus MMW image has a cross section within the inspection zone that is less than, substantially equal to, or is larger than the cross section of the THz beam in the direction of propagation of the THz beam;

The in-focus MMW image is orientated to provide an image cross section of the object along the direction of propagation of the THz beam;

The in-focus MMW image has a cross section within the inspection zone that is less than, substantially equal to, or is larger than separation of the surfaces of the inspection zone.

Other dual mode embodiments may include the following:

An imaging apparatus according to FIG. 5 with:

a THz beam as part of a THz imaging system;

a THz inspection zone defined by an in-focus region of the THz beam within the THz imaging system that is imaged by a THz sensor;

MMW antennas located on the periphery of the THz beam to provide an in-focus MMW image for a MMW imaging system that defines a MMW inspection zone, at least a portion the MMW inspection zone overlapping and spatially collocated with the THz beam path;

signal processing electronics to process the data from the THz sensor and MMW antennas to generate respective images for viewing or image processing, such images optionally being fused to present one image with both THz and MMW generated content;

labeling of the images with physical size in three dimensions such that the size and location of an object within a container can be determined;

analyzing multiple frames of data to determine a range of motion of the object within a container relative to the container, wherein the object may be fixed dimension, a powder or a liquid.

Turning back to FIG. 5, it shows an apparatus comprised of dual inspection zones, one zone for THz and a second zone for MMW imaging. The imaging system of FIG. 5 thus may further be comprised of:

1. A THz beam that diverges from (or converges into) the THz inspection zone and wherein the MMW antennas are on the periphery of the diverging or converging portion of the THz beam. The MMW antennas may be in closer proximity to the diverging portion of the beam than to the in-focus region of the beam (as shown in FIG. 8);
2. MMW antennas placed in a configuration around a THz beam in the form of an arc, a circle, a square, orthogonal rows, or a rectangle;
3. A depth of field of the MMW inspection zone that is less than, substantially equal to, or larger than the dimension of the THz inspection zone in the direction of propagation of the THz beam;
   3.1.1, wherein the in-focus MMW depth of field includes, excludes or overlaps the THz inspection zone;
      3.1.1.1, wherein for an apparatus with separated THz and MMW inspection zones, an object is moved such that at least a portion of the object is imaged in both inspection zones simultaneously;
         3.1.1.1.1, wherein 3D imagery of an object is combined or stitched over time to generate a 3D fused THz and MMW image;
      3.1.1.2, wherein in-focus MMW data is obtained throughout the range of motion of an object in the object scanning apparatus within the MMW inspection zone and the MMW inspection zone fully encompasses the THz inspection zone;
      3.1.1.3, wherein in-focus MMW data is obtained throughout the range of motion of an object in the object scanning apparatus within the MMW inspection zone and the MMW inspection zone is fully encompassed by the THz inspection zone;
4. RF antennas placed in an orientation along the direction of propagation of the THz beam (see FIG. 2);
   4.1.1, wherein the antennas are placed within a support structure that determines the spacing between the first and second surfaces;
   4.1.2, wherein the antennas are placed within multiple support structures that determine the spacing between the first and second surfaces;
   4.1.3, wherein the antennas so placed are either transmit or receive antennas;
5. The in-focus MMW image is orientated to provide an image cross section of the object from a perspective perpendicular to the direction of propagation of the THz beam;
   5.1, wherein the in-focus MMW image has a cross section within the inspection zone that is less than, substantially equal to, or is larger than the cross section of the THz beam in the direction of propagation of the THz beam;
   5.2, wherein the MMW and THz inspection zones are substantively perpendicular in their shortest dimensions;
   5.3, wherein the MMW and THz inspection zones are substantively perpendicular in their longest dimensions.
6. The RF antennas are placed such that the cross section of the THz inspection zone and the cross section of the radiation inspection zone are substantively orthogonal.

Other dual mode embodiments may be comprised of the following:
1. An imaging apparatus with:
   1.1.1. A MMW beam as part of a MMW imaging system;
   1.1.2. A MMW inspection zone defined by the in-focus region of the MMW beam of the MMW imaging system as imaged by a MMW sensor;
   1.1.3. A THz beam with a THz in-focus depth of field region within the MMW inspection zone as part of a THz imaging system, as imaged by a THz sensor;
   1.1.4. Signal processing electronics to process the data from the THz sensor and MMW antennas to generate respective images for viewing or image processing.

The in-focus region, depth of field and resolution of the MMW imaging system is in part a function of the MMW antenna frequency, antenna phase, bandwidth, number and location of the MMW antennas, and the antenna aperture (the "antenna configuration"). In certain embodiments, the THz system performance, the diameter of the THz collimated beam in the inspection zone and the length of the inspection zone are determined by the antenna configuration to provide (1) coincident THz and MMW imaging at one or more locations within an object inspection zone, or (2) the same object field of view or depth of field within the inspection zone.

In certain embodiments, the THz and MMW imaging modes may operate at different image frame rates and with different latencies as presented to the operator or image processor. In certain embodiments, the THz imaging system operates at a higher frame rate than the MMW imaging system (e.g. 500 Hz vs 10 Hz).

In certain embodiments, the imaging apparatus may contain a single inspection zone wherein the container under test is interrogated by, for example, the RF or THz beams (each a band) or multiple inspection zones, one for each of the two bands, the multiple inspection zones having different object field sizes and magnifications for each of the RF and THz imaging systems. The multiple inspection zones may or may not overlap.

In certain embodiments with RF and THz imaging systems having different fields of view and/or magnifications, motion of the object (or motion of the beam relative to the object) may be used to combine images from each imaging system to obtain a fused image for the operator or image processor with the same field of view or magnification from both imaging systems.

In certain embodiments, the RF or MMW and THz imaging systems are used to locate, dimensionally size and characterize an object within the container under test (i.e. a "container object"). A THz transmissive imaging system, in the absence of container motion relative to the THz beam, may be inherently a two-dimensional imaging system; that is, it provides a planar (x and y coordinate) view of the object orthogonal to the direction of THz beam propagation (z coordinate), with the optical signal formed by the interaction of the THz beam along entire z path of the THz beam through the container. The MMW or RF imaging system, as known in the art, is capable of viewing x-y planar or diagonal slices at different locations in the z axis dimension and then stitching such slices, and thereby is capable of determining size and location of a container object within the container in three dimensions.

In certain embodiments with different fields of view, a larger field of view imaging mode (e.g. THz) may be used to identify container regions of interest for imaging inspection by a second imaging mode (e.g. MMW) with a smaller field of view. Since the resolution of an optical system may typically depend on wavelength (as well as other factors such as the number and placement of imaging elements), in this manner the cost or complexity of an imaging mode may be reduced by leveraging a lower cost large field of view to pinpoint regions of interest for a cost driven lower field of view imaging mode.

Through chemometrics or similar techniques as known in the art, characteristics (e.g. THz beam absorption) of multiple container substances may be determined from the interaction of the THz beam with the container and the thickness (i.e., length along the optical axis) in the direction of the THz beam path of the substances as determined by the MMW imaging apparatus. For example, THz absorption by the container and object at various spatial locations can be determined through the application of the Beer-Lambert Law. The determination of a substance characteristic in one spatial region of the container may be used to determine a characteristic of a second substance in another spatial region of the container, wherein such region the THz beam interacts with both substances along its propagation path. For example, the absorption of a first substance can be measured in one region where a first substance absorbs the THz optical beam along a first substance optical path, and first sample absorption may then be used to determine the absorption of a second substance along a second substance optical path in a region where both a first substance optical path and second substance optical path absorb the THz beam, all enabled by the determination of optical path lengths within the substances using the MMW imaging apparatus.

Figure 9:
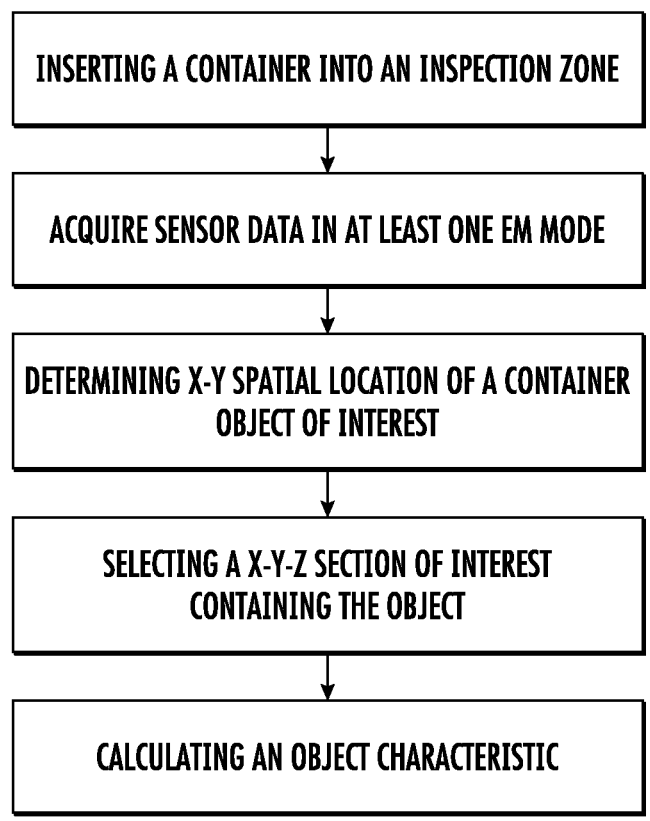
FIG. 9 shows a method for dual mode inspection in accordance with certain embodiments.

In certain embodiments (as shown in FIG. 9), a method of characterizing a container object comprises:
1. Inserting a container into an inspection zone wherein a THz beam and a second mode CSR beam, which may be an MMW or RF beam, are substantively orthogonal to each other in their respective substantive directions of electro-magnetic wave propagation;
2. Acquiring sensor data and generating an image of the container, and selecting a container object of interest using at least one of the THz beam or second mode CSR signals (i.e., at least one mode);
3. Determining the spatial locations of a container object of interest in at least two dimensions;
4. Using the spatial locations to select a 3-D slice or section of the object of interest, the section substantively including a z dimension (i.e. along the direction of THz beam propagation) spatial component of the object; and
5. Calculating a characteristic of the object from within the x-y-z section and from the interaction of both the THz mode and second mode CSR signals within the object, which may include the object physical shape, THz absorption profile vs z thickness, absorption coefficient, reflectivity of a surface, MMW absorption profile vs x or y thickness, or optical index vs z thickness.

Such method may further include one or more of:
1. Movement of the object relative to the second mode CSR beams in the inspection area;
2. Movement of the in-focus region of at least one second mode CSR beam relative to the object;
3. Selection of transmit or receive antennas of a second mode CSR beam;
4. Determining a substance absorption of container due to a substance in one spatial region of the container not containing the object and using the substance absorption to calculate the characteristic of the object.

In certain embodiments of the method, the first mode THz and second mode CSR propagation are substantially parallel to each other.

In certain embodiments, a THz imaging system and a MMW imaging system are combined with a change of the container 201 (or its objects 200) spatial position relative the imaging systems. The MMW wave system, as a 3-dimensional imaging system, maps the change in shape of the container 201 or an object 200 in the container 201, or the relative position of the object 200 within the container 201 over time, and this information is combined with observed object changes from THz transmitted or reflected images to generate a combined image as known in the art, the image presented to an operator or used in subsequent image processing.

In certain embodiments, a THz image of a container 201 may be used to view and locate container substances or objects 200 that interact with the RF energy, and the size, position or substance type determination may be used in the RF characterization of the container (including objects therein). RF characterization may include changes in signal amplitude, frequency, phase or some derivative thereof. The substance may be characterized by optical index, and differential propagation delays through different substance (objects) may be used to determine object dimensions or present object images to an operator or image processor. RF characterization may further include monitoring changes in the dielectric properties including both real and imaginary parts of the container or material contained therein.

In certain embodiments, visible or infrared sensor data is combined with RF and THz data to create a fused image or to determine a characteristic of an object. In one embodiment, the container may have spatially varying substances on its surface that are detected through the visible or infrared sensor data, the sensor data then being used to spatially position the object relative to the RF or THz imaging apparatus to determine a characteristic of the object.

In certain embodiments, the THz beam may be formed using a THz emitter (which may include a voltage-controlled oscillator, Schottky diodes, a frequency multiplier, amplifier, phase locked loop, patch or planar shaped antennas, emersion or contact lenses or horn antenna), and beam forming and shaping optics (i.e. free form mirrors and lenses). The second mode CSR beam or signal may be formed by the placement, alignment, relative phase, and the frequency or directivity of multiple transmitters, receivers and transceivers. Selection of relative beam locations, beam dispersion, optical element properties, optical filters and electronic filters may be used to ensure that the THz and the second mode CSR do not interfere in the generation of data or imagery from each of the modes.

In certain embodiments, elements of the first mode THz and second mode CSR may be combined for purposes of enhanced object characterization capabilities, or improved object scanning apparatus specifications (including cost and form factor). A dual mode source may be an emitter/transmitter for use in both the second mode CSR and THz mode. The dual mode source, sources or source array may be frequency modulated for use in a MIMO imaging system as described previously. The THz sensor may also be sensitive to the dual mode source frequency used in MIMO imaging, and thus one source may be used for reflective MIMO imaging and transmissive THz imaging.

In certain embodiments, optical elements may be used to combine a source operating substantively at one frequency with a second source operating at a different frequency to create dual frequency beam for detection by a broadband sensor (e.g. a THz sensitive bolometer array). In certain embodiments, mixing of the two sources is performed to create data or imagery resulting from the electromagnetic interference of the two sources.

In certain embodiments, the THz and second mode CSR beam may be at a fixed frequency or span multiple frequencies.

In certain embodiments, a THz or second mode CSR polarized beam or signal may be emitted, and the interaction of the container with the polarized beam as measured by the sensor as a function of object spatial position, may be used to characterize the container or a substance therein.

In certain embodiments one of the dual beams or signals may be used to change a property of a container substance (e.g. temperature) and the other beam or signal may be used to sense the changed property and determine a characteristic of the substance.

In certain embodiments, an external stimulus may be applied to the container and a change in a characteristic of the container or objects therein may be determined from the dual mode imagery. The stimulus may be one of temperature, air pressure, moving air, radiation (including infrared radiation), physical contact or pressure, sound waves, liquid contact, or chemical contact.

In certain embodiments external inputs such as temperature, humidity, pressure sensors and the like may be used to correct or compensate for variations in the measured RF or THz energy due to environmental variations or external noise factors.

In certain embodiments, the THz and second mode CSR image data may be analyzed in signal processing to perform the following functions and create fused imagery or object characterization:

1.
  a. Deliberate interference between the two modes for better object characterization;
  b. Using one band to create a change in the properties of the object for measurement by one or both bands (i.e., IR to heat and changing spatial shape, water content, or absorption).

MMW (i.e. radiative, radar) imaging systems based on MIMO, SIMO, MISO, SISO and other antenna arrays and technologies as known in the art typically work in reflection, wherein amplitude, phase time of flight, and/or frequency varying electromagnetic signals are reflected off object surfaces back to receiving antenna(s) for processing to generate a two or three dimensional object image. For example, a typical system may use Frequency Modulated-Continuous Wave (FM-CW) techniques as is known in the art. However, for certain applications it also may be advantageous to capture image data efficiently in transmission, or simultaneously with reflection imagery. In certain embodiments, antennas can be positioned on both sides of an object being imaged, typically with electrical signals running between the transmit antennas on one side of the object and receive antennas on the other side of the object to enable use of FM-CW signal processing techniques.

Figure 10:
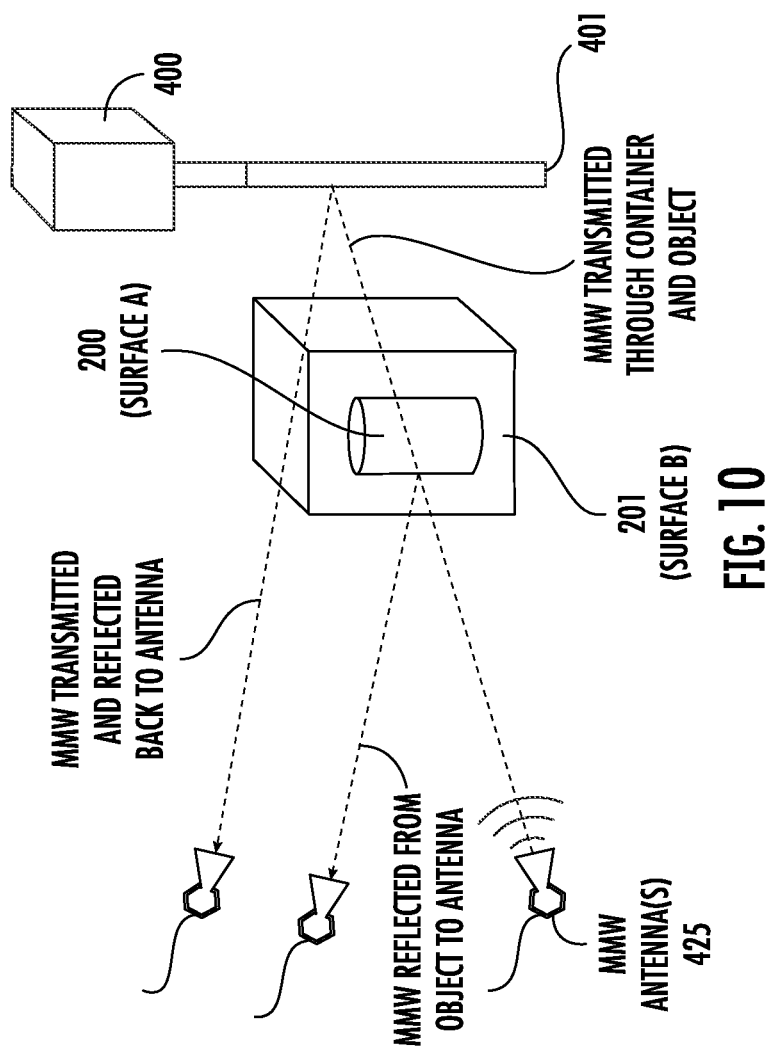
FIG. 10 shows a reflection radar imaging apparatus in accordance with certain embodiments.

FIG. 10 shows an embodiment of an imaging system that uses a mirror 401 (which may include a mirror motion actuator or motor 400) to reflect the MMW signals back to an antenna array 425, thereby enabling second mode transmit and receive antenna to be substantively collocated (i.e., on a single circuit board with electronic signals passed between the antenna signal generation circuitry as known in the art). Signal processing of the reflected a signals by range (e.g. FM-CW or time of flight) may then be used to separate out signals by range and thus provide one of more of the following:

1. MWW signals form a first object image of surface A of object 200 generated from the MMW beam reflected from that surface back to the antenna array 425, surface A at a range X from the antenna array 425, the signals being a function of surface A reflectivity and the transmittance of intervening substances and surfaces.

2. MWW signals form a first container image of surface B of container 201 generated from the MMW beam reflected from that surface back to the antenna array 425, surface B at a range Y from the antenna array 425, the signals being a function of surface B reflectivity and the transmittance of intervening substances and surfaces, including, in certain embodiments, surface A.

3. MWW signals form a first mirror image generated from the MMW beam transmitted through at least one of surface A and surface B and reflected back to antenna array 425 by reflecting surface or mirror 401 at a range ez, the reflected beam being retransmitted through at least one surface A, surface B or container regions not containing surface A or surface B, the signals thus being a function of transmittance of intervening substances and surfaces.

For clarity, reflected signals, data or imagery refers to that set of imagery generated substantively as a result of reflection of the MMW beam or signal when first incident on the object or container surface being scanned. Transmitted signals or imagery refers to that set of imagery generated after being transmitted through the object, reflected off a reflective surface and then transmitted back through the object, through other objects, through object containing container surfaces, or through space proximate to the object, to the MMW receivers, including secondary reflections and object transmissions.

In certain embodiments, image processor calculates from the MMW signals collected by the MMW (or radiation) sensor a three dimensional point cloud that an includes image plane representative of the relative spatial radiation signal incident on the mirror.

In certain embodiments, the mirror 401 is flat and orthogonal to the substantive direction of the MMW radiation direction of propagation, thus retro-reflecting the radiation back to the antenna array 425. However, as an antenna array includes at least more than one transmitter or receiver at different spatial locations, one or more of the specularly reflected beam paths (i.e. MMW wavefronts) will be at a non-orthogonal angle with respect to the reflecting mirror 401, and thus at least one signal will not be precisely retroreflected but may be substantively retroreflected depending on object size and the geometry of the MMW imaging system.

In certain embodiments, the mirror 401 is at an angle to the average direction of propagation of the MMW emitted signals from one or more emitters (collectively, "an emitter"), thus creating a substantive reflective path back through the object that is spatially different than the transmissive path first through the object being imaged. The mirror angle may be selected as a function of the spatial location of objects or substances being imaged. The mirror orientation relative to the object may controlled by an actuator 400, the position of the mirror 401 determined in a feedback loop that uses 1) a reflected signal from the container or object, or 2) the transmitted signal. In certain embodiments, the polarization of the reflected or transmitted signal, or differential polarization of the reflected and transmitted signal are used 1) to generate processed signals for subsequent image or signal processing, or 2) in a feedback loop. In one embodiment, the mirror reflective surface and the average alignment direction of the receiving transducers are substantively orthogonal to the average direction of radiation propagation from the emitter.

In certain embodiments, the mirror 401 may have optical power to change the convergence or divergence of the MMW beam on its return path through the object being imaged.

In certain embodiments, the mirror 401 be located in the path of the terahertz optical beam and may transmit at terahertz frequencies.

In certain embodiments, the beam pointing direction of each transmitter is varied to improve field of view, depth of field or other characteristics of the imaging system.

In certain embodiments, the reflective surface of mirror 401 may be a conveyor belt surface, and the imaging system may be scanning objects on the surface of the conveyor as they move relative to the imaging radiation.

In certain embodiments, the mirror 401 may be dithered in a continuous or step-stop manner to create a time varying reflective path back to receiving antenna array 425. The mirror movement may be synchronous with the generation of MMW antenna signals or image generation frame rate, or may be asynchronous.

In certain embodiments, the spatial separation of transmissive and reflective paths through the object 200 or container 201 may be combined to increase the effective resolution of a fused image (e.g. super-resolution). Movement of the mirror 401 may be used to change the separation of the paths, wherein the reflective path is independent of mirror position and the transmissive path is a function of mirror position.

In certain embodiments, the reflective and transmissive signals are processed to determine characteristics of an object, surface or substance. The characteristic may include index of refraction, absorption coefficient, transmittance or reflectivity. The index of refraction or knowledge on the speed of beam propagation in the object 200, the object containing container 201, or container substances being scanned may be used to correct range calculations in the transmitted image. In certain embodiments, the characteristic of the container region comprised of a substance X (including its surface X) and not containing the object may be determined, and that characteristic may be used in the processing of the signals that comprised both object and the same substance X. In certain embodiments, the characteristic is clutter (i.e., container substances interfering with characterization of the object 200). The determination of the characteristic may require calibration of the object scanning instrumentation and apparatus through the use of calibration reference objects and reference substances as known in the art.

In certain embodiments, the reflected signals from the mirror 401 are combined with one or both of first object signals and first container signals to determine a characteristic of the object or container. The characteristic may include a physical property of substances or spatial regions within the container. The physical property may be surface reflectivity,, refractive index, or absorption. Determining the characteristic may include using the three dimensional view of the container to segment the signals and determine optical path lengths and the three dimensional spatial volume of regions comprised of the same or substantially similar substances (e.g. spatial regions comprised of a packing material and a powder pouch).

In certain embodiments, the surface of the mirror 401 may have a pattern that absorbs or scatters MMW radiation such that the pattern may be imaged by the MMW imaging system. The pattern may be used as a spatial or range reference, or for calibration of the MMW imaging system. The pattern may cover only a small percentage of the mirror surface or may be over the entire mirror surface. In one embodiment, the mirror 401 may have a surface profile that varies spatially, the surface profile in terms of height variations and spatial location may be selected to provide calibration of the imaging system for resolution, polarization, background compensation, or range. In one embodiment, the surface of the mirror 401 has a spatial region wherein the mirror surface varies in height orthogonal to the mirror surface and the height variation is used to calibration or characterize the imaging system.

The antenna array 425 may include subarrays A and B, each an antenna array, each subarray with an in-focus depth of field for object imaging at a different range from its respective antenna subarray transmitters. The subarrays may be located at different positions in x-y-z space, that is a varying distance to the object. The multiple in-focus depth of fields may overlap such that a first depth of field is in-focus for reflection imaging of the object from subarray A, and the second in-focus depth of field is in-focus for imaging the object with subarray B after reflection off a reflective surface. In certain embodiments, the subarray MMW signals may be modulated at different frequencies, the frequencies selected to reduce signal interference or crosstalk at the subarray receivers. The selection of the transmitters and receivers may vary in a fixed manner or repetitive manner over time, or may be selected as a function of the characteristics (e.g. spatial dimensions, absorption, index or electromagnetic wave interactive properties, substance or object location in a container) of the container or object being imaged. In certain embodiments, the subarrays may transmit in difference time slots to avoid interference. In certain embodiments, the processed signals from one subarray may be used to control the timing or other characteristic of the second subarrays transmitted signal.

In certain embodiments, the reflective and transmitted signals are combined to achieve improved signal to noise ratio when imaging the surface of an object or substance being imaged.

Figure 11:
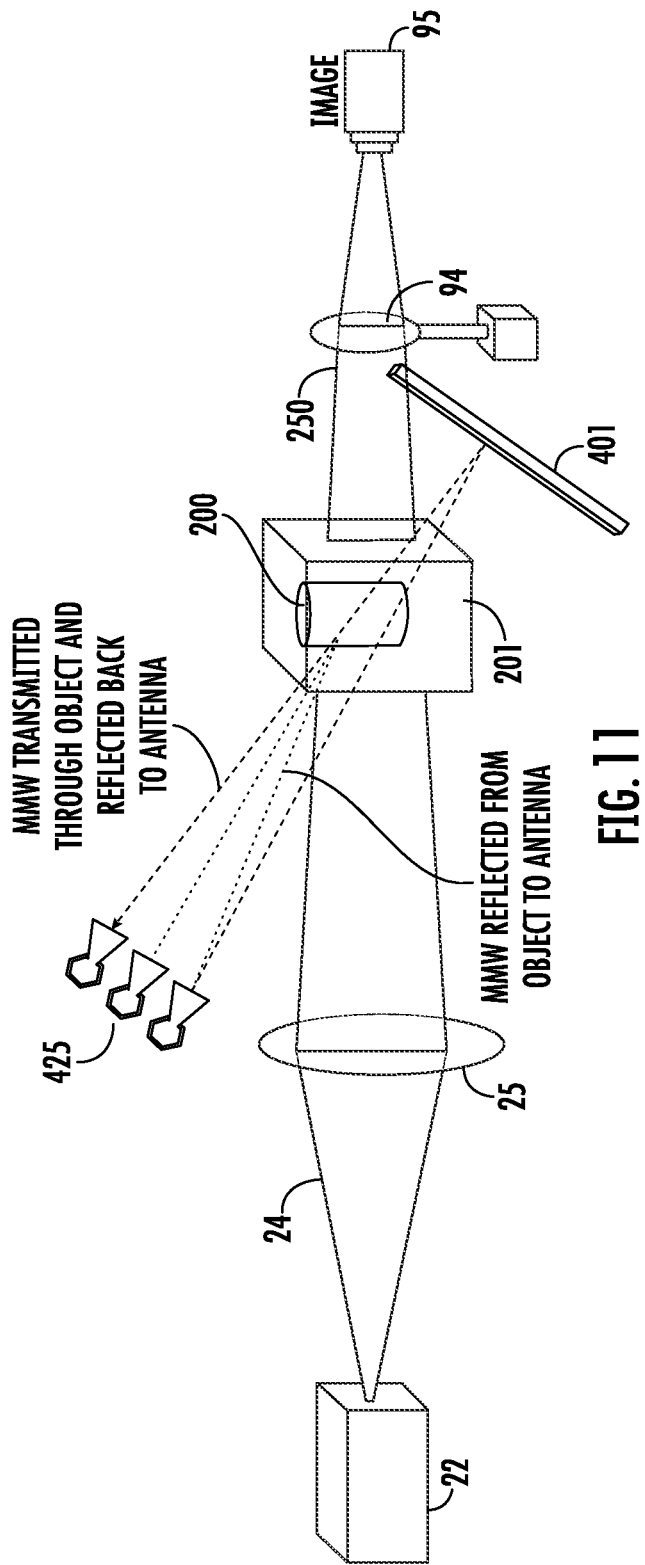
FIG. 11 shows dual mode reflective imaging apparatus in accordance with certain embodiments.

FIG. 11 shows a dual mode embodiment wherein a transmissive-reflective MMW imaging system is combined with a transmissive THz imaging system. The antenna array 425 and reflective mirror 401 may be placed off-axis such that, while not precisely coaligned, the object view as imaged by the MMW and THz imaging systems are substantially aligned, or within a viewing angle of less than 45 degrees. In certain embodiments, the THz and MMW imaging systems may be orthogonal to each other.

In certain embodiments, the reflected signals from the mirror 401 and the transmissive THz signals are combined with one or both of first object signals and first container signals to determine a characteristic of the object or container. Determining the characteristic may include using the MMW three dimensional view and two-dimensional THz view of the container to segment the container volume and determine the three dimensional spatial volume of regions comprised of the same or substantially similar substances.

Figure 12:
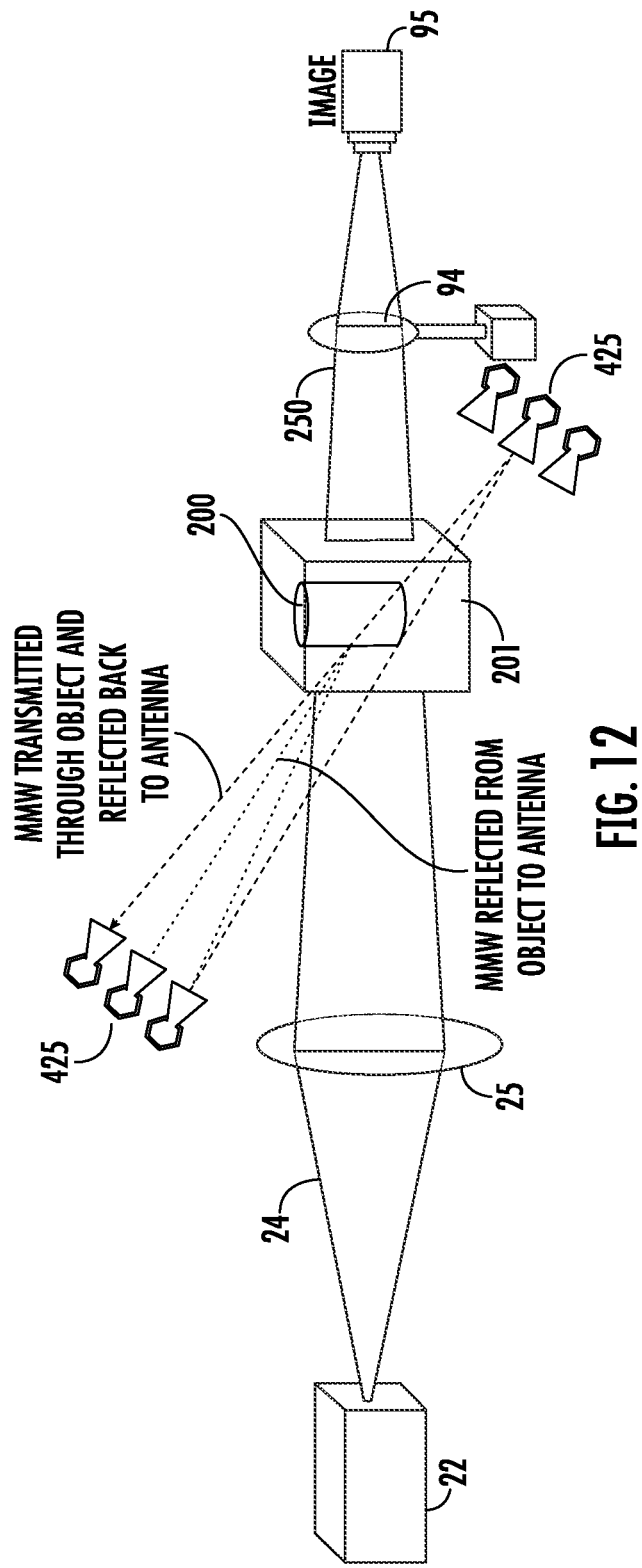
FIG. 12 shows the dual mode multiple MMW imaging system apparatus in accordance with certain embodiments.

As will be clear to those knowledgeable in the art, many of the embodiments as described for a reflective and transmission MMW apparatus with a MMW reflecting mirror may also have application to an apparatus wherein MMW receivers are located to receive transmitted MMW signal, such an apparatus shown in FIG. 12. Such an apparatus may be comprised of some combination of SIMO, MISO and SISO configurations, including subarrays thereof at difference spatial locations relative to the object to be scanned.

In certain embodiments, there is provided motion of the container 201. The motion may be relative to the radiation fields within the inspection zone. FIGS. 3 and 6 show a portion of such an apparatus, specifically the optical train and motion components as part of an object scanning apparatus working in transmission with transmitted THz beam 250 (FIG. 3), and in reflection plus transmission (FIG. 6, with reflected beam 250' and reflection imaging THz sensor 95'), all with a single THz source 22. Multiple THz sources 22 and imaging sensors 95, such as THz imaging sensors, with directing or combining optics, also may be used. Reflection imaging may be advantageous when container 201 or object 200 has high reflectivity and low transmission. Containers 201 including both reflective and transmissive objects can thereby be characterized simultaneously using imaging sensors 95 and 95'. In FIGS. 3-6, the object 200 may be enclosed within a container 201. In certain embodiments, object 200 or container 201 may experience physical motion, the physical motion being necessary to induce a change in a physical property of the container 201 or object 200 (e.g. motion of a fluid in container 201), or a change in relative physical properties (e.g. physical motion of the object 200 relative to the container 201). The motion may be provided by human handling, or by a container actuator 210, motor or other mechanical apparatus.

In certain embodiments, the motion be used to position and move the container within the terahertz and MMW in-focus regions, simultaneously or sequentially, the motion inducing the same change in physical property for both the THz and MMW imaging apparatus over time. While MMW or RF, is referenced in several of the drawings and examples, it is understood that the second mode CSR may be a different CSR frequency band, such as THz.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An object scanning apparatus, comprising:
    a terahertz source for generating a propagated optical beam;
    a THz inspection zone defined by an in focus region of the propagated optical beam;
    an electromagnetic energy source for generating a radiation signal at a frequency other than that of the terahertz source, wherein the radiation signal passes through the THz inspection zone such that objects interact with the propagated optical beam and radiation signal;
    at least one imaging sensor configured to collect the propagated optical beam after the interacting; and
    an image processor for taking data from the at least one imaging sensor, and processing the data to determine a characteristic of an object.

2. The object scanning apparatus of claim 1, wherein the electromagnetic energy source for generating the radiation signal is an RF source, a millimeter wave source, a second terahertz source or a combination thereof.

3. The object scanning apparatus of claim 1, wherein the electromagnetic energy source for generating the radiation signal has an in focus region that is smaller in volume than the THz inspection zone.

4. The object scanning apparatus of claim 3, wherein the electromagnetic energy source for generating the radiation signal has an in focus region that overlaps with the THz inspection zone.

5. The object scanning apparatus of claim 1, wherein the propagated optical beam has a direction, and wherein the radiation signal is emitted or collected orthogonal to the direction of the propagated optical beam.

6. The object scanning apparatus of claim 5, wherein the electromagnetic energy source and a second imaging sensor operate in reflection, transmission or both transmission and reflection modes.

7. The object scanning apparatus of claim 1, wherein the radiation signal is emitted from a handheld device.

8. The object scanning apparatus of claim 1, wherein the radiation signal is emitted by multiple emitters in a multiple input multiple output configuration.

9. The object scanning apparatus of claim 1, wherein the at least one imaging sensor comprises at least one imaging sensor configured to collect the propagated optical beam and at least one radiation signal imaging sensor to collect the radiation signal.

10. An object scanning apparatus, comprising:
    a terahertz source for generating a propagated optical beam;
    a THz inspection zone defined by an in focus region of the propagated optical beam;
    a radiation energy source for generating a radiation signal at a frequency other than that of the terahertz source;
    a radiation inspection zone defined by an in focus region of the radiation energy source;
    a THz sensor for collecting the propagated optical beam emitted from the THz inspection zone;
    a radiation sensor for collecting the radiation signal emitted from the radiation inspection zone; and
    an image processor for taking data from the THz sensor and radiation sensor of an object within the THz inspection zone and radiation inspection zone, and combining the data from the THz inspection zone and the radiation inspection zone to determine a characteristic of the object.

11. The object scanning apparatus of claim 10, wherein the radiation signal collected by the radiation sensor passes through the propagated optical beam.

12. The object scanning apparatus of claim 11, wherein the THz inspection zone and radiation inspection zone overlap.

13. The object scanning apparatus of claim 11, wherein the propagated optical beam and radiation signal are substantially aligned.

14. The object scanning apparatus of claim 11, wherein a cross section of the THz inspection zone and a cross section of the radiation inspection zone are substantively orthogonal.

15. An object scanning apparatus, comprising:
    a terahertz source for generating a propagated optical beam;
    a THz inspection zone defined by an in focus region of the propagated optical beam;
    a THz sensor for collecting the propagated optical beam emitted from the THz inspection zone;

a radiation energy source for generating a radiation signal at
a frequency other than that of the terahertz source;
a radiation inspection zone defined by an in focus region of the radiation energy source;
a mirror having a reflective surface for reflecting the radiation signal emitted from the radiation inspection zone;
a radiation sensor for collecting the radiation signal reflected from the reflective surface; and
an image processor for taking data from the THz sensor and radiation sensor of an object within the THz inspection zone and radiation inspection zone, and combining the data from both inspection zones to determine a characteristic of the object.

16. The object scanning apparatus of claim 15, wherein the radiation signal reflected by the mirror and collected by the radiation sensor passes through the radiation inspection zone.

17. The object scanning apparatus of claim 15, wherein the image processor calculates from the data collected by the radiation sensor a three-dimensional point cloud and an image plane representative of a relative spatial radiation signal incident on the mirror.

18. The object scanning apparatus of claim 15, wherein the reflective surface of the mirror has a spatial region wherein the mirror surface varies in height orthogonal to the mirror surface.

19. The object scanning apparatus of claim 18, wherein variations of the mirror surface are used to calibrate or characterize the object scanning apparatus.

* * * * *